(12) United States Patent
Jeffery et al.

(10) Patent No.: US 8,976,530 B2
(45) Date of Patent: Mar. 10, 2015

(54) DATA STORAGE APPARATUS

(75) Inventors: Alan Jeffery, Ripley (GB); Andrew Paul George Randall, Newbury (GB); David Ian Belcher, Wantage (GB); Alastair Bryers, Wallingford (GB); Stephen Freeman, Leamington Spa (GB)

(73) Assignee: Nexsan Technologies Limited, Derby (GB)

( * ) Notice: Subject to any disclaimer, the term of this patent is extended or adjusted under 35 U.S.C. 154(b) by 431 days.

(21) Appl. No.: 13/459,905

(22) Filed: Apr. 30, 2012

(65) Prior Publication Data
US 2012/0212909 A1 Aug. 23, 2012

Related U.S. Application Data

(62) Division of application No. 12/646,575, filed on Dec. 23, 2009, now Pat. No. 8,191,841.

(30) Foreign Application Priority Data

Dec. 23, 2008 (GB) .................................. 0823407.2
Aug. 15, 2009 (GB) .................................. 0914331.4
Aug. 17, 2009 (GB) .................................. 0914332.2

(51) Int. Cl.
*H05K 5/00* (2006.01)
*G11B 33/02* (2006.01)
(Continued)

(52) U.S. Cl.
CPC .............. *G11B 33/02* (2013.01); *G11B 33/126* (2013.01); *G11B 33/128* (2013.01); *G11B 33/142* (2013.01); *H02G 11/00* (2013.01)
USPC ........... 361/724; 361/725; 361/726; 361/727; 361/728; 361/730; 361/679.33; 361/679.39

(58) Field of Classification Search
CPC .... G11B 33/126; G11B 33/142; G11B 33/02; G06F 1/187; G06F 1/181; H05K 7/1488; H05K 5/0217
USPC .............................. 361/724–730, 679.31–695
See application file for complete search history.

(56) References Cited

U.S. PATENT DOCUMENTS 3,448,346 A 6/1969 Webb
3,647,936 A 3/1972 Dryg
(Continued)

FOREIGN PATENT DOCUMENTS

AT 352933 B 10/1979
DE 2833043 A1 2/1979
(Continued)

*Primary Examiner* — Robert J Hoffberg
*Assistant Examiner* — Hung Dang
(74) *Attorney, Agent, or Firm* — Dorsey & Whitney LLP

(57) ABSTRACT

Data storage apparatus comprising a main housing containing an electric power supply, a panel supporting a plurality of electric connectors for connecting the power supply to other component parts of the apparatus and a plurality of units. Each of the units comprises a plurality of data storage elements and is mounted to slide from within the main housing to provide access to its data storage elements.
The apparatus also comprises a plurality of cable modules each comprising a cable having a first connector at a first end connected to one of the units and a second connector at a second end connected to an electric connector on the panel. The cable modules also include a moveable rigid structure providing a barrier preventing manual access to the panel. The second connector is attached to the rigid structure such that movement of the rigid structure causes the second connector to be disconnected.

18 Claims, 19 Drawing Sheets

(51) Int. Cl.
*G11B 33/12* (2006.01)
*G11B 33/14* (2006.01)
*H02G 11/00* (2006.01)

(56) References Cited

U.S. PATENT DOCUMENTS

| | | |
|---|---|---|
| 3,744,869 A | 7/1973 | Anderson et al. |
| 4,199,225 A | 4/1980 | Slaughter et al. |
| 4,308,421 A | 12/1981 | Bogese, II |
| 4,472,598 A | 9/1984 | Boyd et al. |
| 4,533,790 A | 8/1985 | Johnston et al. |
| 4,660,125 A | 4/1987 | Purdy et al. |
| 4,933,513 A | 6/1990 | Lee |
| 4,952,020 A | 8/1990 | Huber |
| 5,025,115 A | 6/1991 | Sayegh et al. |
| 5,030,794 A | 7/1991 | Schell et al. |
| 5,053,583 A | 10/1991 | Miller et al. |
| 5,057,646 A | 10/1991 | Nichols et al. |
| 5,097,099 A | 3/1992 | Miller |
| 5,162,611 A | 11/1992 | Nichols, III et al. |
| 5,212,756 A | 5/1993 | Eoll |
| 5,286,924 A | 2/1994 | Loder et al. |
| 5,342,991 A | 8/1994 | Xu et al. |
| 5,360,944 A | 11/1994 | Springer et al. |
| 5,428,187 A | 6/1995 | Crane et al. |
| 5,450,285 A | 9/1995 | Schlemmer |
| 5,502,287 A | 3/1996 | Nguyen |
| 5,552,565 A | 9/1996 | Cartier et al. |
| 5,598,498 A | 1/1997 | Comezzi |
| 5,750,932 A | 5/1998 | Hansson |
| 5,761,032 A | 6/1998 | Jones |
| 5,834,698 A | 11/1998 | Izui et al. |
| 6,025,989 A | 2/2000 | Ayd et al. |
| 6,070,742 A | 6/2000 | McAnally et al. |
| 6,295,401 B1 | 9/2001 | Rutterman et al. |
| 6,327,139 B1 | 12/2001 | Champion |
| 6,392,884 B1 | 5/2002 | Chou |
| 6,459,571 B1 | 10/2002 | Carteau |
| 6,462,670 B1 | 10/2002 | Bolognia et al. |
| 6,590,768 B1 | 7/2003 | Wiley |
| 6,621,693 B1 | 9/2003 | Potter et al. |
| 6,734,364 B2 | 5/2004 | Price et al. |
| 6,844,500 B2 | 1/2005 | Williams et al. |
| 6,870,105 B2 | 3/2005 | Maydanich et al. |
| 7,206,481 B2 | 4/2007 | Quinn et al. |
| 7,612,289 B2 | 11/2009 | Lique et al. |
| 7,678,998 B2 | 3/2010 | Lind et al. |
| 8,599,550 B2 * | 12/2013 | Davis et al. .............. 361/679.39 |
| 8,797,732 B2 * | 8/2014 | Ganta Papa Rao Bala ........................ 361/679.32 |
| 2003/0045159 A1 | 3/2003 | Boudreaux |
| 2003/0049105 A1 | 3/2003 | Mueller et al. |
| 2006/0002093 A1 * | 1/2006 | Carlson et al. ................ 361/726 |
| 2006/0028805 A1 | 2/2006 | Hidaka |
| 2006/0048001 A1 | 3/2006 | Honda et al. |
| 2006/0061955 A1 * | 3/2006 | Imblum ........................ 361/685 |
| 2006/0187634 A1 | 8/2006 | Tanaka et al. |
| 2007/0017883 A1 | 1/2007 | Bridges et al. |
| 2007/0230110 A1 | 10/2007 | Starr et al. |
| 2007/0230111 A1 * | 10/2007 | Starr et al. .................... 361/685 |
| 2007/0233781 A1 | 10/2007 | Starr et al. |
| 2007/0247804 A1 | 10/2007 | Li et al. |
| 2008/0007912 A1 | 1/2008 | Matsushima et al. |

FOREIGN PATENT DOCUMENTS

| | | |
|---|---|---|
| EP | 0109557 A1 | 5/1984 |
| EP | 0425447 A1 | 5/1991 |
| EP | 0635836 A1 | 1/1995 |
| EP | 1975940 A2 | 10/2008 |
| FR | 2491284 A1 | 4/1982 |
| GB | 1407022 A | 9/1975 |
| GB | 2377084 A | 12/2002 |
| JP | 57154229 A | 9/1982 |
| JP | 59-30632 U | 2/1984 |
| JP | 62-172226 U | 10/1987 |
| JP | 63-164281 U | 10/1988 |
| JP | 1-53519 B2 | 11/1989 |
| JP | 3-3799 U | 1/1991 |
| JP | 2006235964 A | 9/2006 |
| WO | 0196991 A1 | 12/2001 |
| WO | 2009114002 A1 | 9/2009 |

* cited by examiner

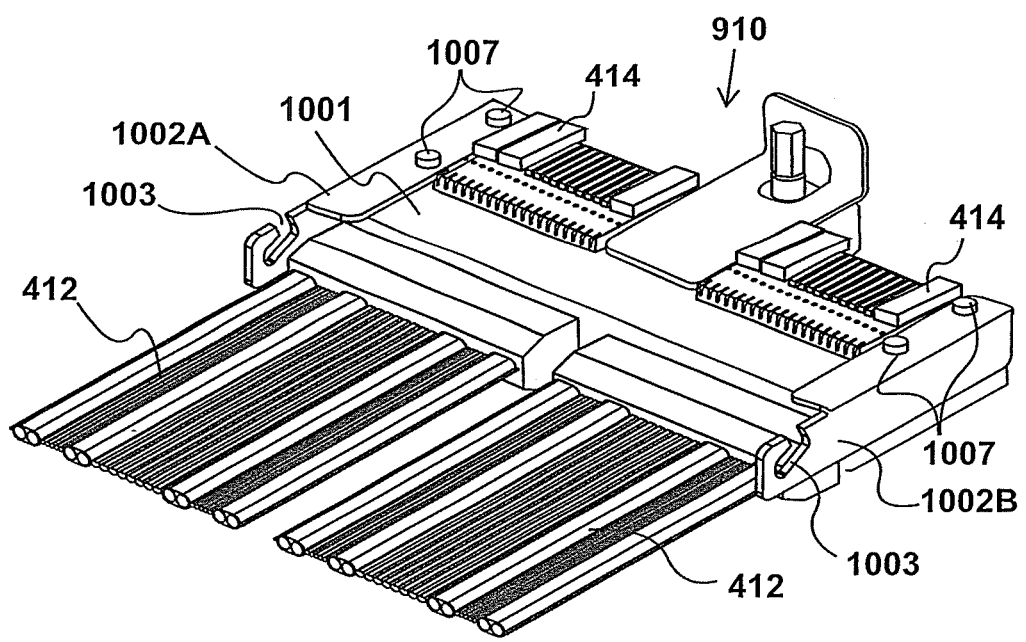
Figure 10A
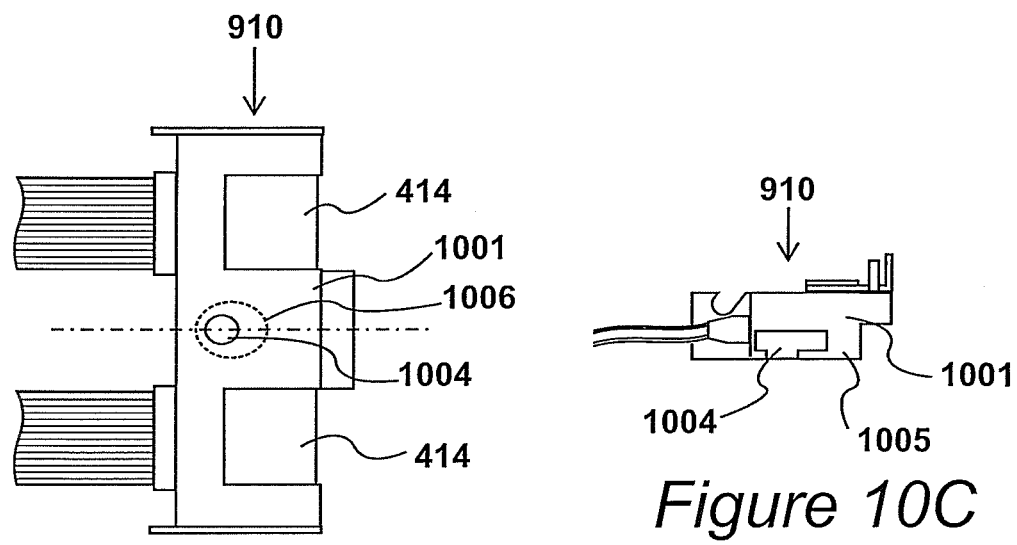
Figure 10B
Figure 10C

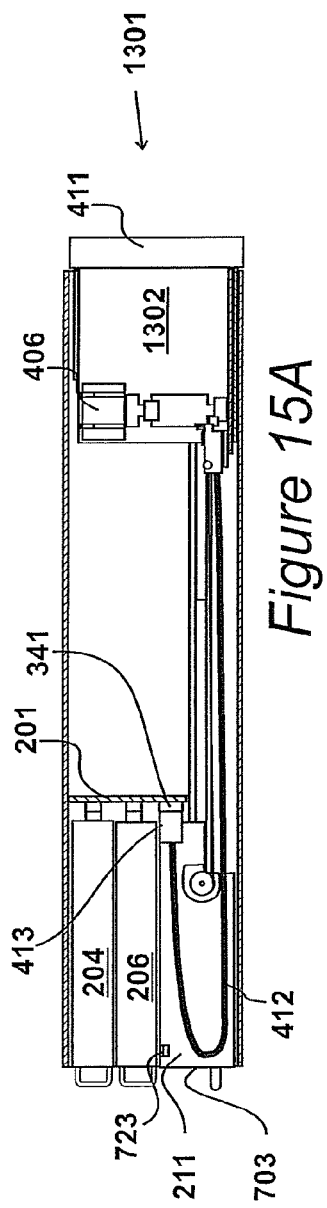
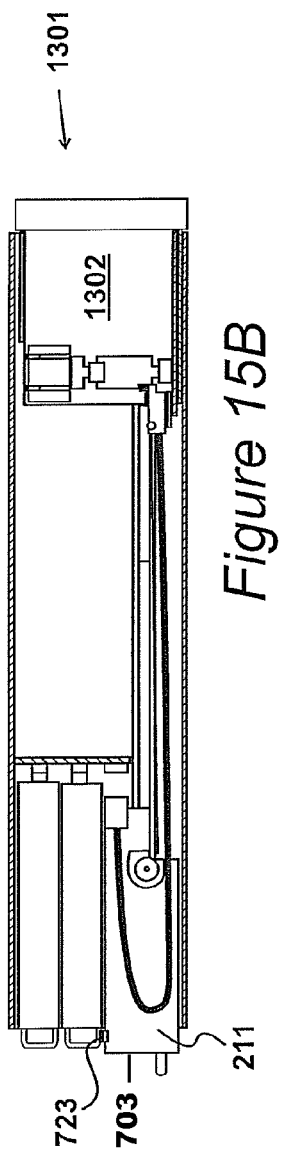
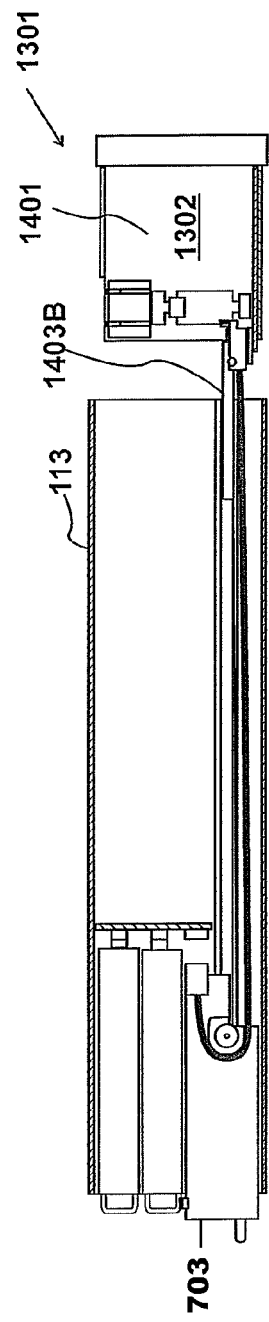
Figure 15A
Figure 15B
Figure 15C

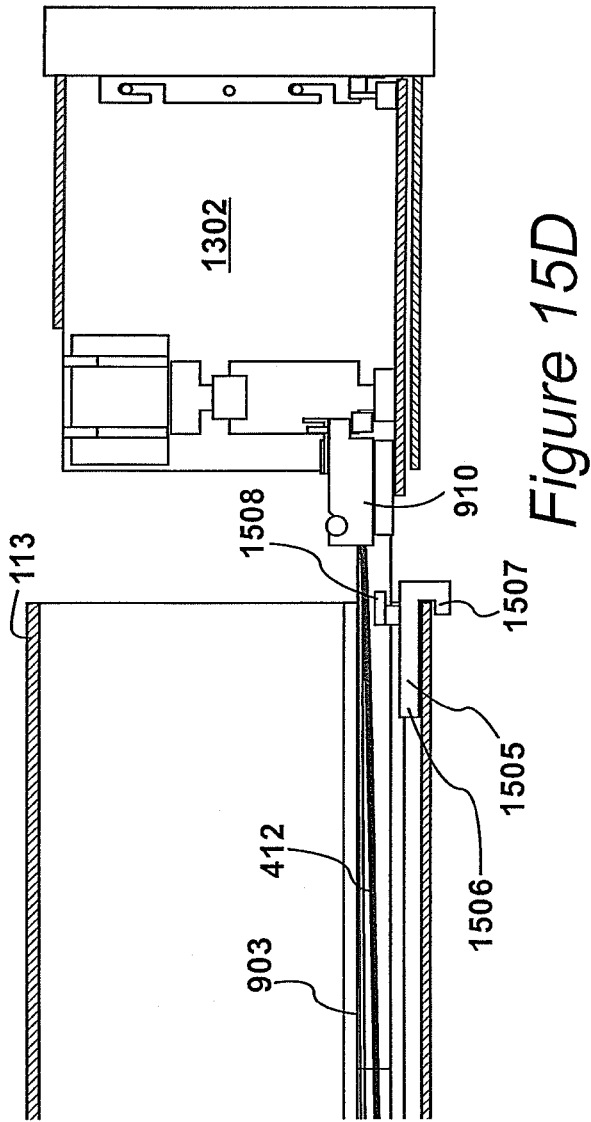
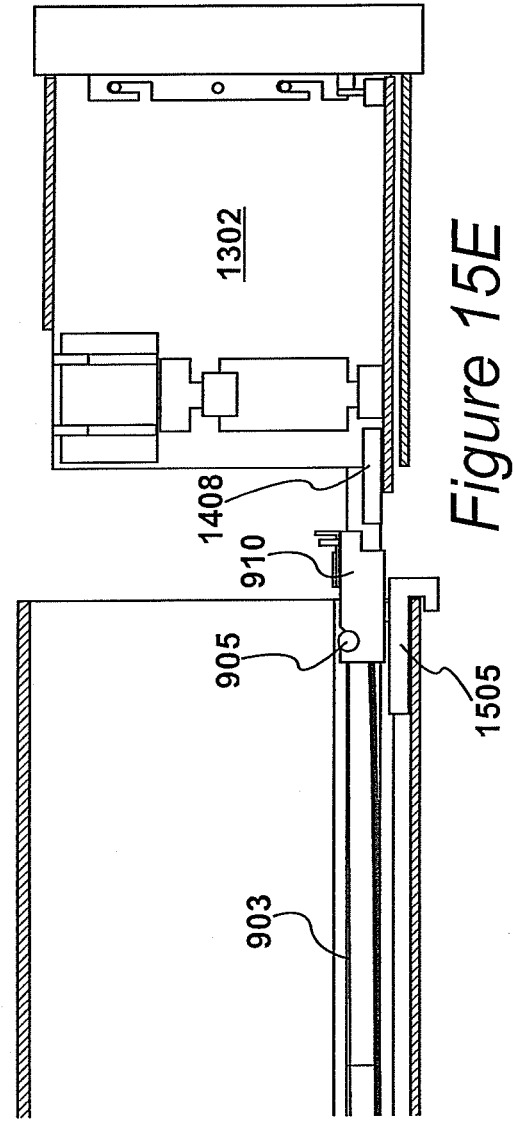

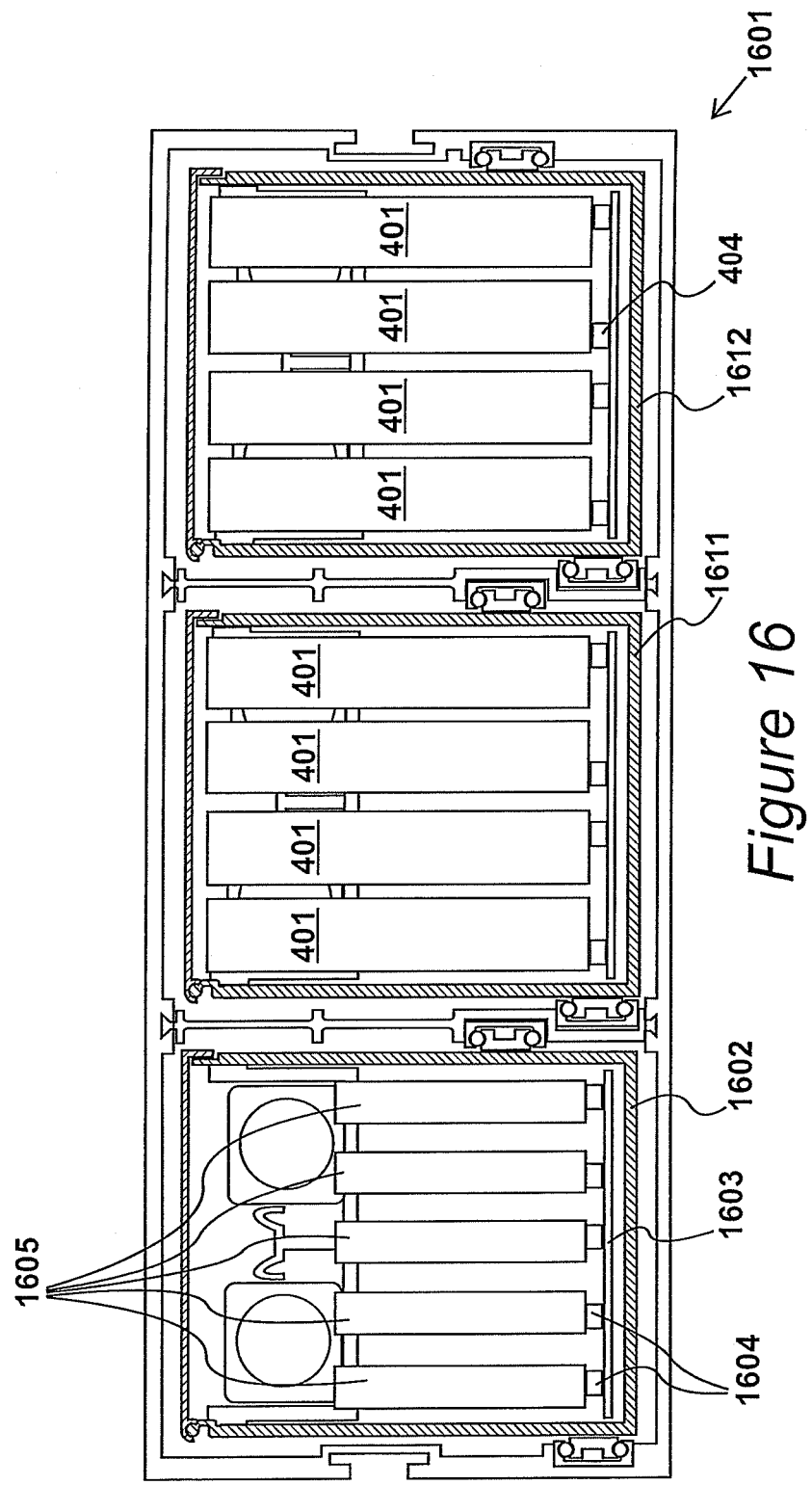

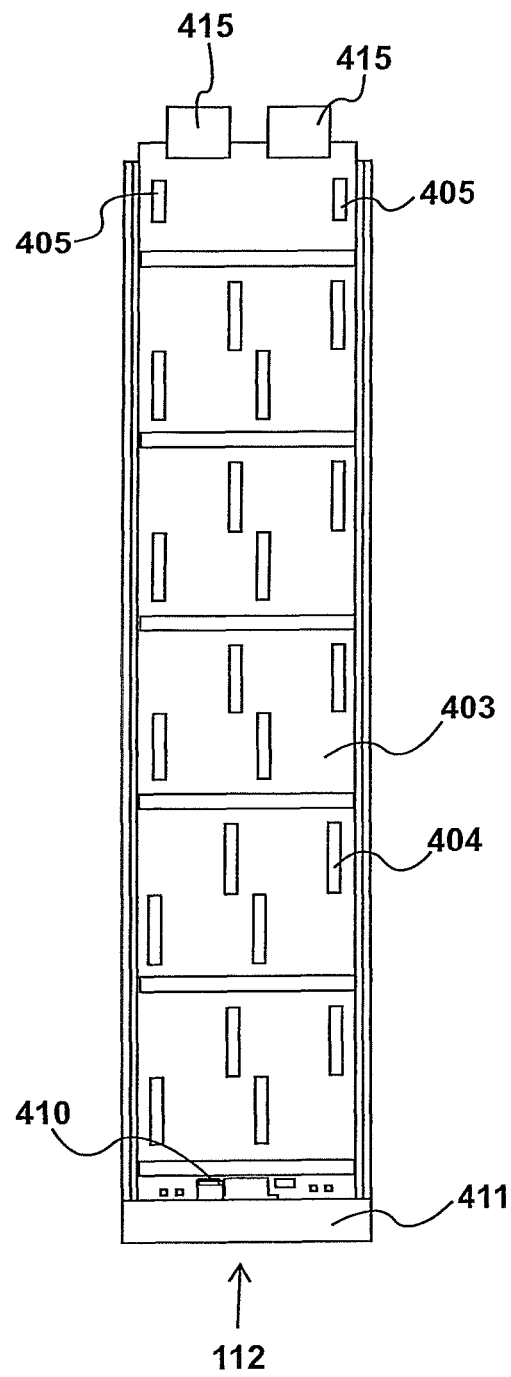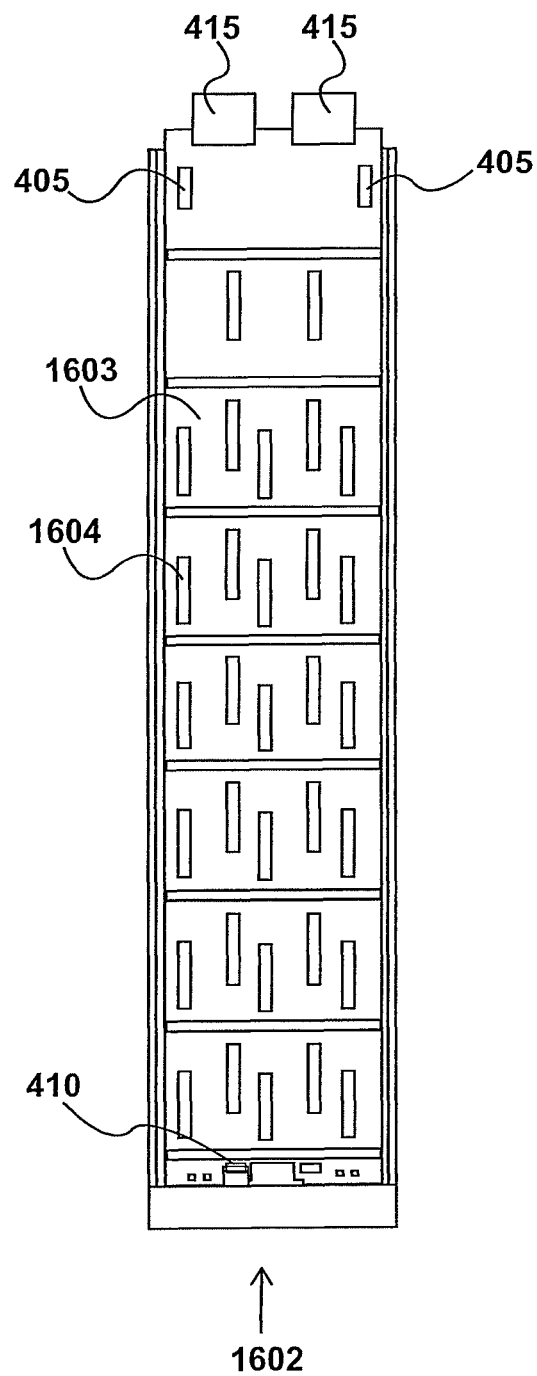
*Figure 17A*          *Figure 17B*

DATA STORAGE APPARATUS

BACKGROUND OF THE INVENTION

1. Field of the Invention

The present invention relates to apparatus for storing data and supplying stored data.

2. Description of the Related Art

Data storage units are known that are configured for mass data storage or as RAID (redundant array of inexpensive disks) systems. Such storage units comprise of several disk drives and one or more control units for controlling data input to, and output from, the disk drives. The storage units may be located within a standard size rack unit, typically occupying 1 U to 6 U (1 to 6 rack units) of rack space, and may share the rack with other equipment, and possibly other such data storage units.

Occasionally it is necessary to access the disk drives, for example, for the purposes of replacement of a defective drive, or a drive needing to be upgraded. In some data storage units, access to the disk drives is made possible by the removal of a panel that forms part of the outer main housing of the storage unit.

In recent times it has become known to have a data storage unit in which the disk drives are arranged in several groups, each group supported on a separate support structure that provides electrical connections between the disks drives and a cable connected to the control unit. Each support structure may be slid forward from out of the outer main housing of the storage unit, while the support structure remains electrically connected by the cable to the control unit.

A first problem with such a data storage unit relates to a fan that is arranged to provide a flow of cooling air over the disk drives. During normal operation of the unit, the airflow from the fan is constrained by the outer main housing of the unit, such that it must flow over the disk drives. However, if one of the support structures is withdrawn from the outer main housing, for example to replace a defective disk drive, the airflow is no longer constrained and cooling of the disk drives becomes less effective.

A further problem with known data storage units that has been identified by the Applicant, relates to a lack of flexibility in the arrangement of disk drives within a data storage unit. For example, if a data storage unit having a particular number of disk drives of a particular type is being used, then the options for upgrading the storage capacity and/or performance of the unit are limited.

This latter problem is emphasised by a potential owner of a data storage unit purchasing a unit on his/her current requirements, current technology available, and current budget available. Consequently, a unit may be purchased that soon becomes inadequate and requires replacing.

BRIEF SUMMARY OF THE INVENTION

According to a first aspect of the present invention, there is provided apparatus for storing data and supplying stored data, said apparatus comprising: a main housing containing control circuitry for controlling signals to a plurality of disk drives, said main housing having a plurality of mounting mechanisms each configured to support a unit of a first type; a plurality of cables each having a first connector for connecting to a unit of said first type for providing signals from said control circuitry; a first unit, of a first type, having a plurality of second connectors each connected to a disk drive and a fan providing a flow of air for cooling the disk drives and said control circuitry, said first unit being connected to a first one of said cables and mounted in a first one of said mounting mechanisms such that said first unit is mounted to slide into said main housing; and a second unit, of a different second type, supported by a second one of said mounting mechanisms and mounted to slide into said main housing, said second unit being connected to a second one of said cables and having a fan providing a flow of air for cooling said control circuitry, wherein said second unit is removable from said main housing and replaceable by a unit of said first type.

According to a second aspect of the present invention, there is provided apparatus for storing data and supplying stored data, said apparatus comprising: a main housing; a plurality of units, each said unit having a plurality of connectors each connected to a data storage element, and each said unit being mounted to slide within said main housing such that each one of said units is slidable from out of said main housing to provide access to said data storage elements of said unit; and a fan configured to provide a flow of air for cooling the data storage elements, wherein each said unit comprises a channel such that said data storage elements are located within said channel, and said fan is arranged to provide a flow of air though said channel when said unit is located within said main housing and when said unit is slid out from within said main housing.

According to a third aspect of the present invention, there is provided apparatus for storing data and supplying stored data, said apparatus comprising: a main housing; an electric power supply located within said main housing; a panel located within said main housing, said panel supporting a plurality of electric connectors for connecting said power supply to other component parts of said apparatus; a plurality of units, each said unit comprising a plurality of data storage elements, each said unit being mounted to slide within said main housing such that each one of said units is slidable from out of said main housing to provide access to said data storage elements of said unit, and a plurality of cable modules, each module comprising a cable having a first connector at a first end configured to connect to one of said units and a second connector at a second end configured to connect with one of said electric connectors supported by said panel, and a moveable rigid structure supporting said second connector and providing a barrier preventing manual access to said panel thereby allowing said second connector to be disconnected by manually moving said rigid structure.

According to a fourth aspect of the present invention, there is provided electronic apparatus for mounting into a rack, said electronic apparatus comprising: a box; a wall element located within said box to define a first compartment to one side of said wall element and a second compartment to the other side of said wall element; a first unit mounted on slide rails within said first compartment; and a second unit mounted on slide rails within said second compartment, wherein said wall element supports a first slide rail supporting said first unit and a second support rail supporting said second unit, and said first slide rail is supported at a first height and said second slide rail is supported at a second different height, whereby the horizontal spacing between said first and second slide rails is reduced.

According to a fifth aspect of the present invention, there is provided electronic apparatus for mounting into a rack, said electronic apparatus comprising a box having a left side wall and a right side wall, wherein said side walls are formed from extruded metal defining a groove such that a groove extends along an outside surface of each of said left and right side walls for receiving a correspondingly shaped rail that is horizontally mounted within a rack.

BRIEF DESCRIPTION OF THE SEVERAL
VIEWS OF THE DRAWINGS

FIGS. 10A, 10B and 10C show the connection module 910 respectively in a perspective view, simplified bottom view, and simplified cross-sectional view;

Figure 11:
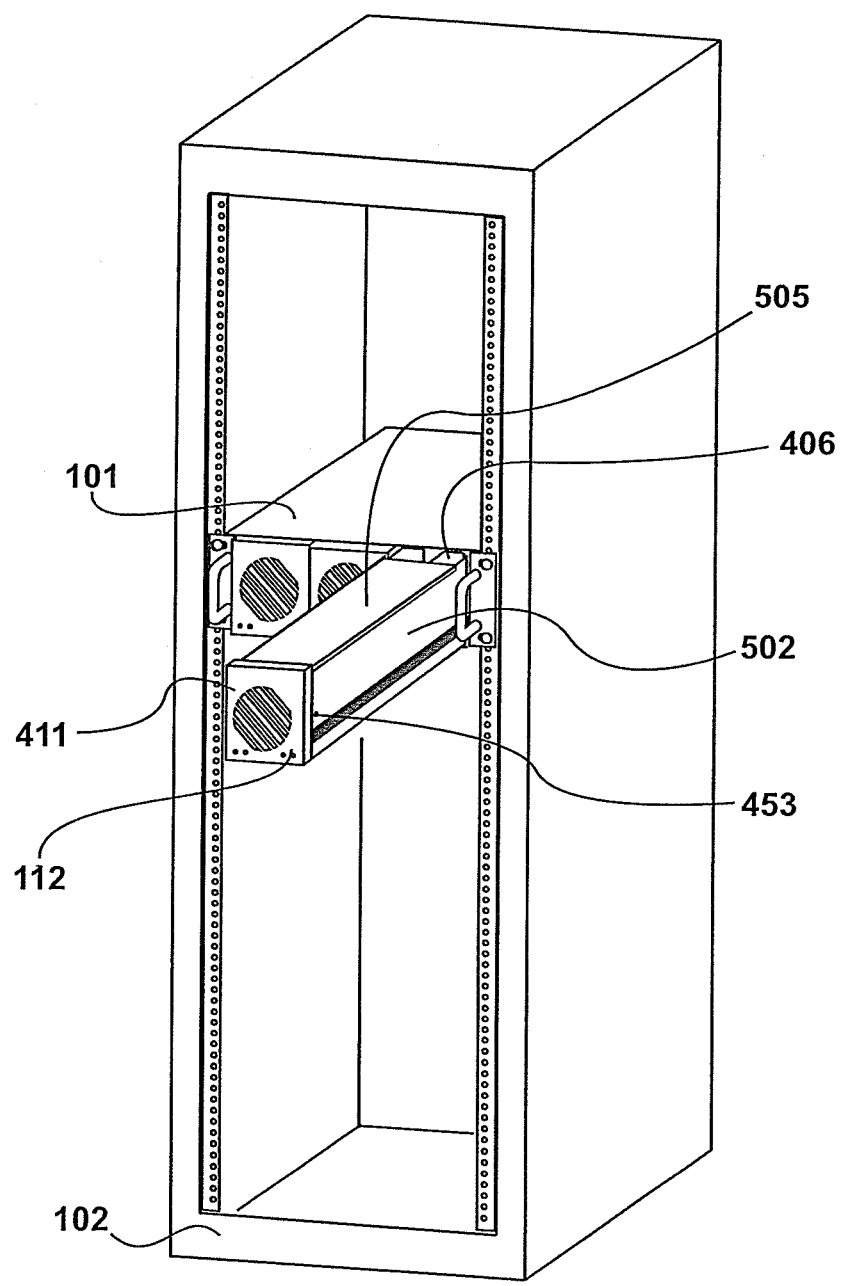
Figure 12:
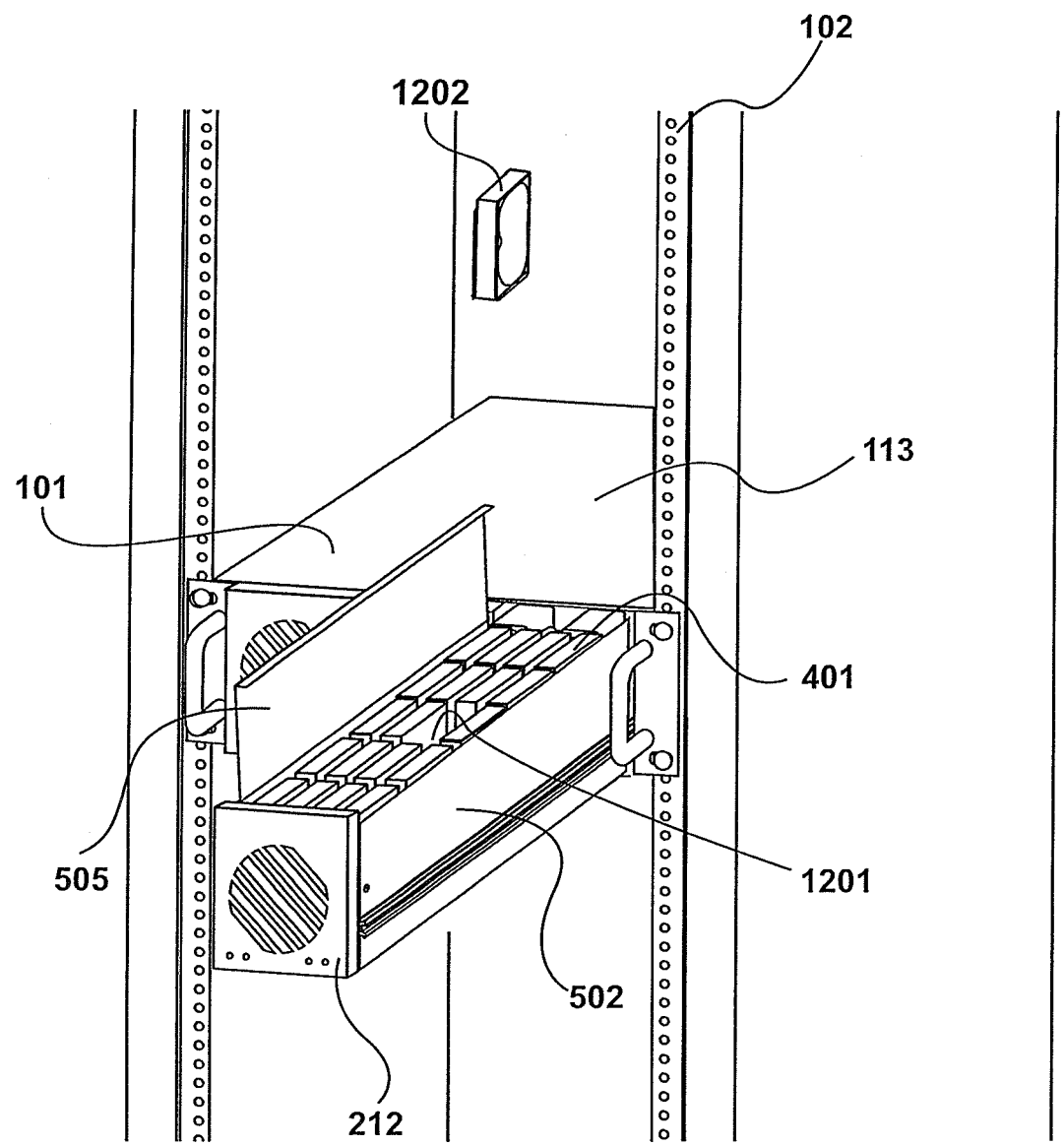
Figure 13:
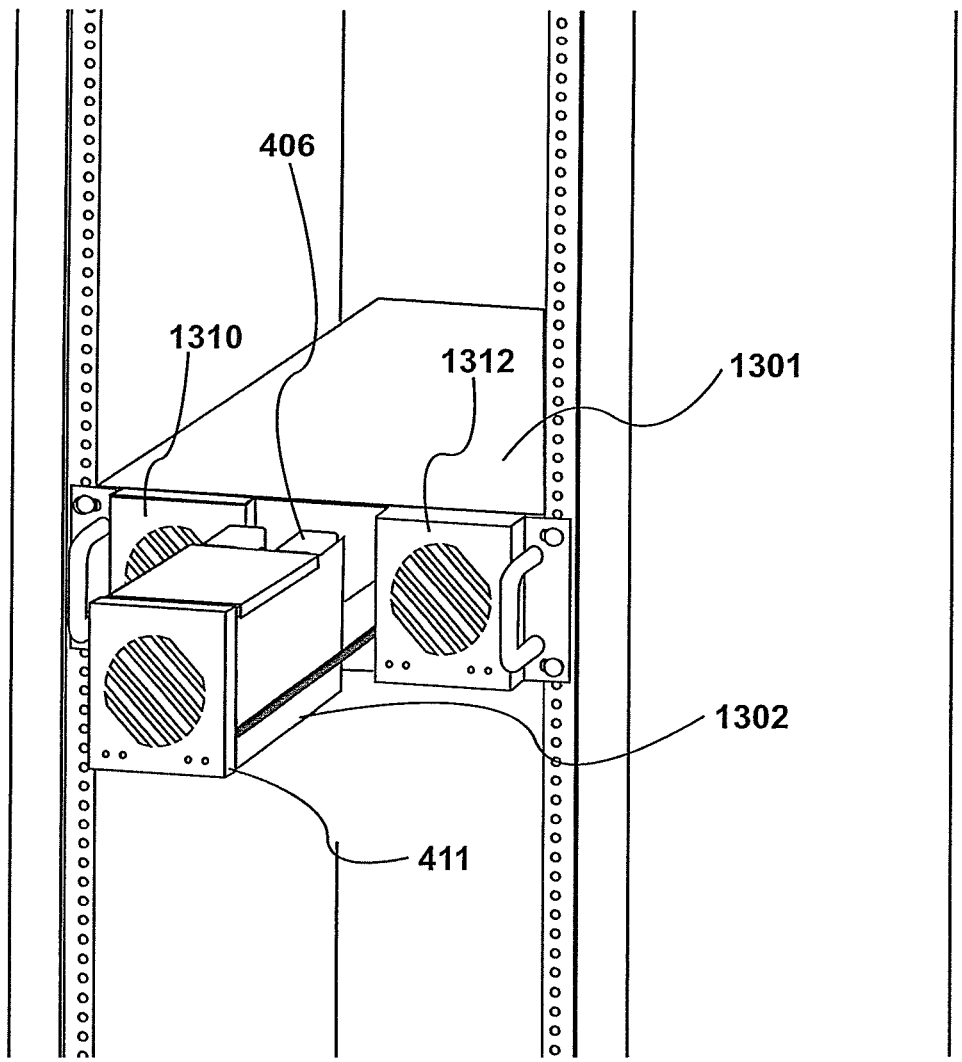
Figure 14:
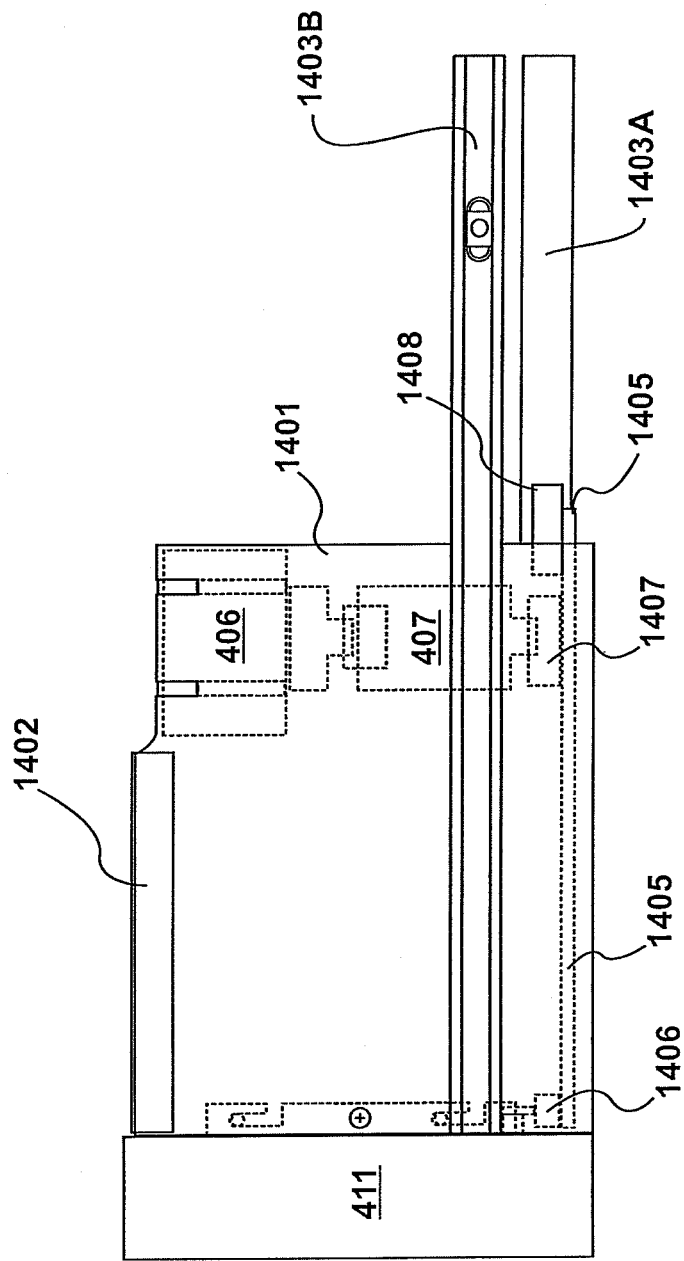

FIG. 11 shows the data storage unit 101 mounted in the rack 102, with support unit 112 pulled out from within the main housing 113;

FIG. 12 shows the data storage unit 101 with the support unit 112 pulled out from the main housing 113 and with the lid 505 of the support unit 112 open;

FIG. 13 shows a second data storage unit 1301 embodying the present invention;

FIG. 14 shows a side view of the data storage unit 1302;

FIGS. 15A to 15H show the process of replacing the unit 1302 with a support unit containing disk drives;

FIG. 16 shows a data storage unit in which one support unit comprises a different type of disk drive to the other two supports units;

FIG. 17A shows a plan view of the support unit 112 without the fan module 406 and without the disk drives 401 fitted; and FIG. 17B shows a plan view of the support unit 1602 without the fan module 406 and without the disk drives 401 fitted.

DETAILED DESCRIPTION OF THE PREFERRED
EMBODIMENTS

FIG. 1

Figure 1:
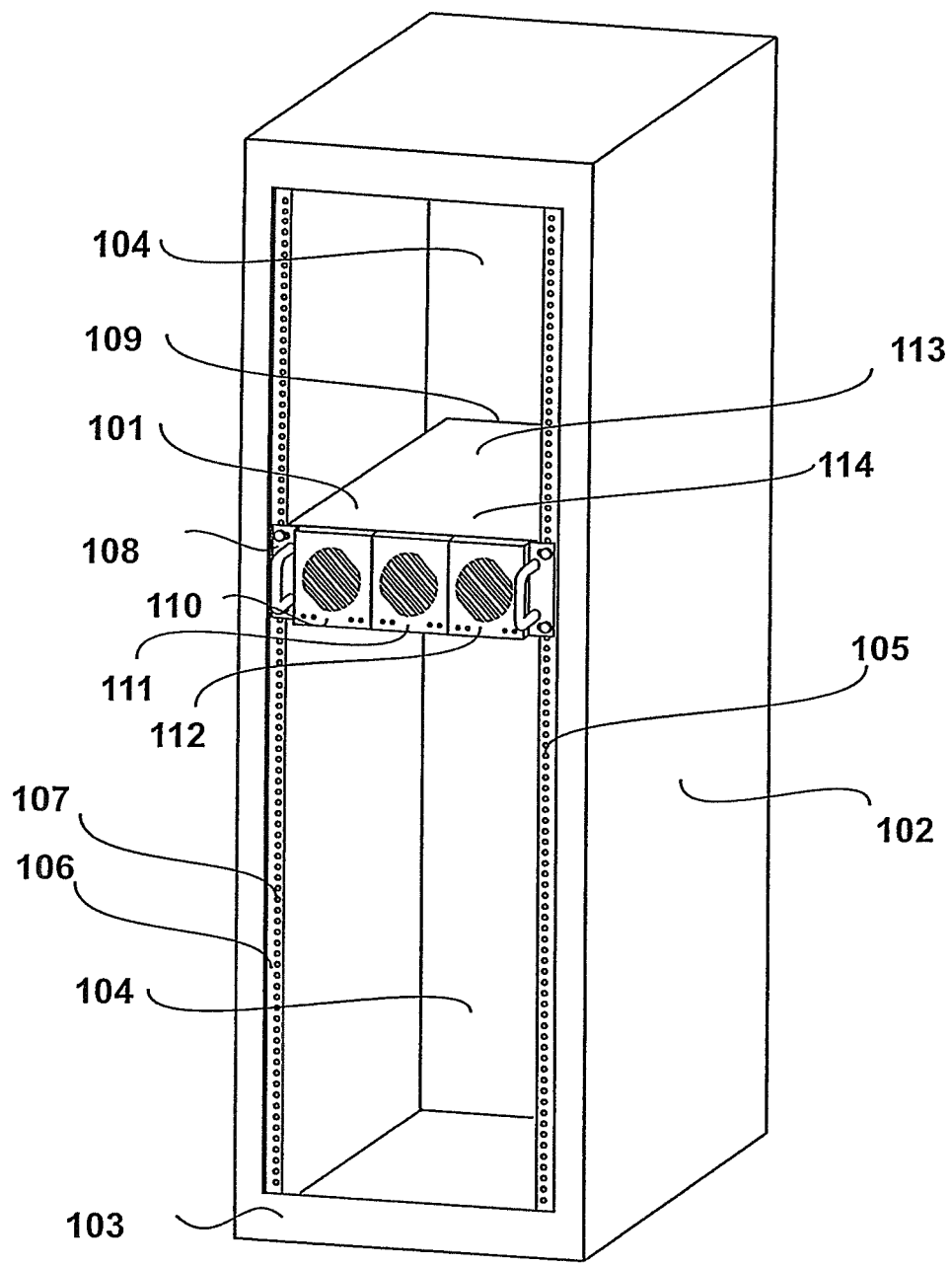
FIG. 1 shows a data storage unit 101 embodying the present invention.

A data storage unit 101 embodying the present invention is shown mounted in a rack 102 in FIG. 1.

The rack 102 is built in accordance with an international standard, EIA-310, and therefore has a specified depth from the front panel 103 to the back panel 104. Similarly, the rack 102 has a standard sized gap between a first rail 105 and a second rail 106 which form part of the front panel 103 and are provided with holes 107 allowing equipment such as data storage unit 101 to be attached and supported.

The data storage unit 101 has a generally rectangular form, but includes a mounting plate 108 at its front end that is provided with apertures allowing the data storage unit to be attached to the rails 105 and 106 of the rack 102. Most of the data storage unit 101 has a width configured to allow said unit to pass between the rails 105 and 106 of the rack 102, and a depth that ensures a gap is provided between the rear end 109 of the data storage unit 101 and the back panel 104 of the rack 102 when the storage unit 101 is mounted, as shown in FIG. 1.

The data storage unit 101 comprises several data storage elements. In the present example, the data storage unit 101 comprises sixty data storage elements in the form of sixty 3.5" (three point five inch) disk drives arranged in three groups of twenty. Each group of twenty disk drives is mounted on one of three support units 110, 111 and 112 located within a space provided within the main part 114 of the data storage unit 101. Each disk drive is connected via its support unit to a control unit via a flexible cable connecting its support unit and a control unit mounted within the data storage unit 101.

The data storage unit is connected to one or more computers, which access and/or edit data stored on the disk drives. Communication between the data storage unit and the one or more computers may be made by known interfaces and protocols, for example communication may be made over a network such as a LAN, WAN, SAN, the Internet, etc. Similarly, communication may be made over a wire, optical link, radio link, etc.

The data storage unit 101 has an outer main housing 113 in which the three support units 110, 111 and 112 are independently supported, such that they can each slide forward out of the main housing 113 independently of the other two support units.

Figure 2:
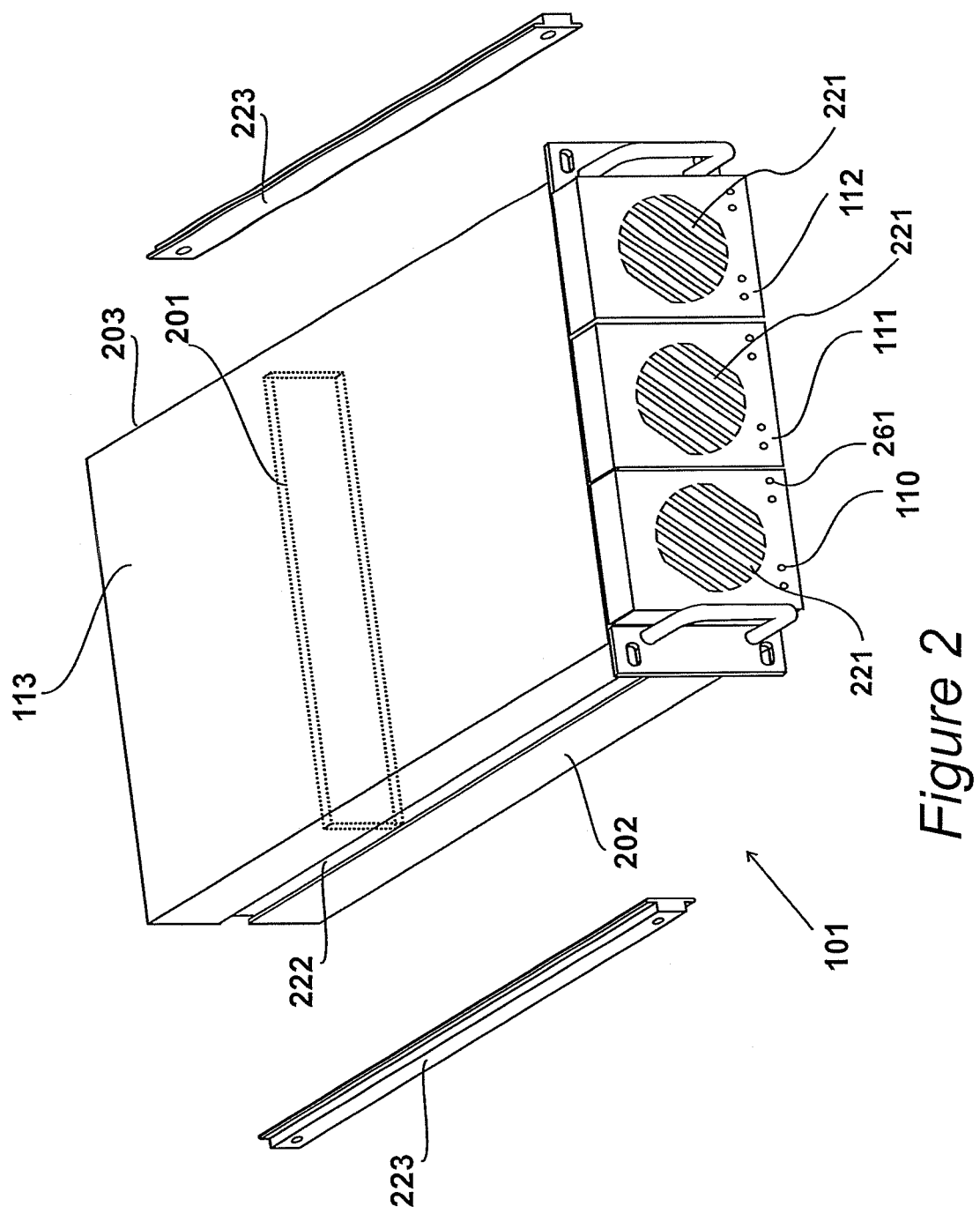
FIG. 2 shows a view of the front top and left side of the data storage unit 101.
Figure 3:
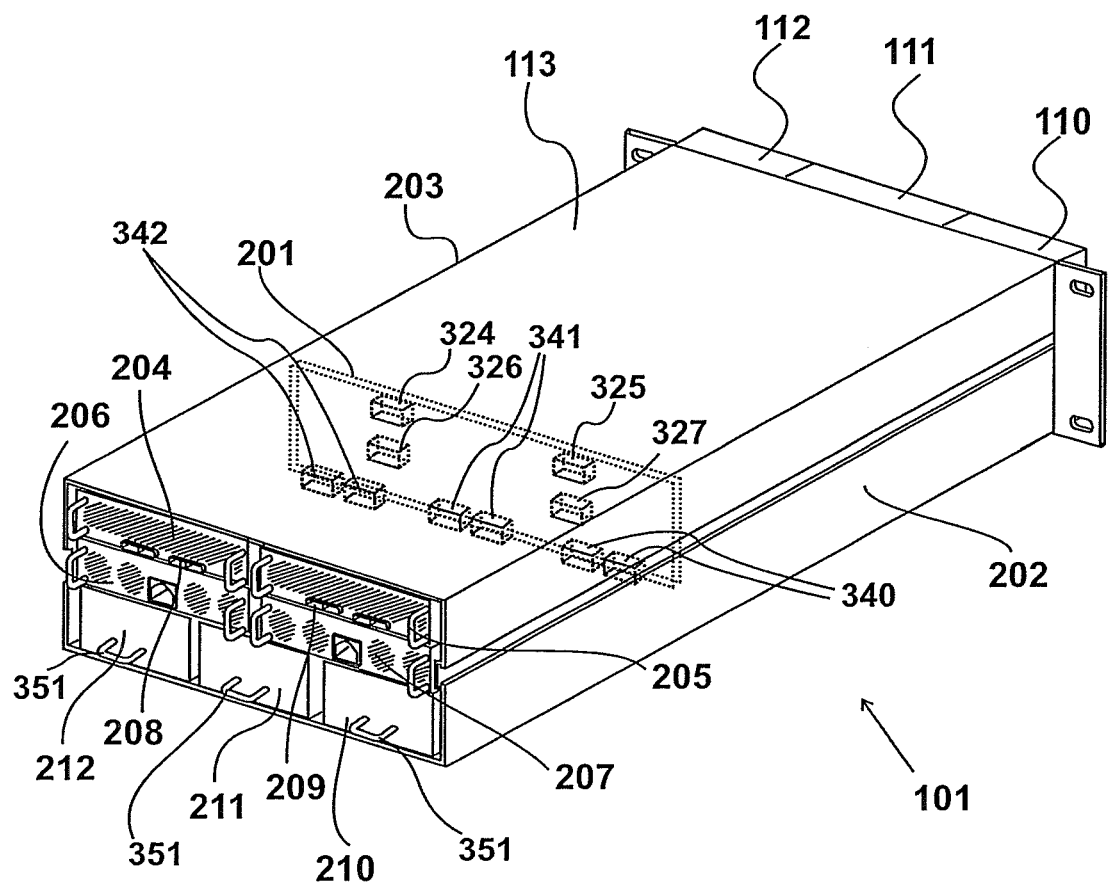
FIG. 3 shows provides a view of the rear, top and left side of the data storage unit 101.

FIGS. 2 and 3

The data storage unit 101 is shown in each of FIGS. 2 and 3. FIG. 2 provides a view of the front top and left side of the data storage unit 101, along with rack rails 223. FIG. 3 provides a view of the rear, top and left side of the data storage unit 101. The main housing 113 is formed from several aluminium alloy extrusions and has a substantially rectangular box form with closed walls at the left, right, top and bottom sides and two open ends at the front and rear. The open-ended front allows access into a space formed within the main housing 113 for the three support units 110, 111 and 112. Similarly, the open rear end allows access into the main housing for components located towards the rear of the data storage unit 101. The support units 110, 111 and 112 occupy approximately the front two thirds of the main housing while other components occupy the rear one third.

The extrusions forming the main enclosure 113 are also formed with grooves such that a groove 222 extends along the outside surface of each of the left and right side walls 202 and 203. The grooves 222 are provided for receiving a correspondingly shaped rail that is horizontally mounted within a rack. Suitable rack rails 223 are shown in FIG. 2. The rails 223 are bolted within the rack 102 so that they extend horizontally from the front to the back of the rack. The ends of the grooves 222 at the rear end of the data storage unit 101 are then located onto the front of the rails 223 and the data storage unit 101 is then slid back into position along the rails 222. The data storage unit 101 is then secured in position by screws located through the mounting plate (108, shown in FIG. 1).

In the present embodiment the rails 223 are themselves formed from extruded aluminum alloy.

Apertures 221 are provided in the front face of each the support units 110, 111 and 112 to allow a flow of air through the support unit for the purposes of cooling the data storage elements, the control units 204 and 205, and the power supplies 206 and 207.

A printed circuit board referred to as the mid-plane 201, is mounted within the main housing 113 perpendicular to the side walls 202 and 203 of the main housing 113. The mid-plane 201 (whose position within the outer main housing 113 is indicated in dotted lines) extends between the left and right side walls 202 and 203 of the main housing 113 and provides electrical connections between the other various components of the data storage unit 101.

Towards the rear of the unit 101, behind the mid-plane 201, the main housing 113 contains two control units 204 and 205 and power supplies 206 and 207. The power supplies 206 and 207 are dual redundant power supplies. It is therefore possible for the data storage unit 101 to operate with just one of the power supplies operational. The control units are also redundant, so it is possible for the data storage unit 101 to operate with just one of the control units 206 or 207.

The rear surfaces of the power supplies 206 and 207 are provided with electrical sockets to allow connection to an electricity supply. The power supply units 206 and 207 are each configured to transform an electricity supply and thereby provide a suitable DC electricity supply for the data storage unit 101.

The control units 204 and 205 comprises control circuitry for controlling inputs and outputs to the disk drives, they are provided with suitable sockets 208, 209 to provide connection to a network, etc as previously mentioned.

The data storage unit 101 also comprises three cable modules 210, 211 and 212. The cable modules are each linearly aligned with an associated one of the support units 110, 111 and 112. Thus, support unit 110 has an associated cable module 210, support unit 111 has an associated cable module 211, and support unit 112 has an associated cable module 212. The three cable modules are all similarly configured and perform similar functions in respect of their respective support unit. The cable modules each define a space in which electric cables connecting the support units 110, 111, 112 and the control units 204, 205 (via the mid-plane 201) reside. Each cable module comprises a pair of cables, of which one cable is redundant in normal use.

As shown in FIG. 3, each of the three cable modules 210, 211 and 212 is provided with a handle 351 to allow a user to pull the respective cable module out from the back of the main housing 113. The cable modules 210, 211, 212 will be further described below.

The front face of each of the three support units 110, 111 and 112 is provided with an array of indicator elements. In the present embodiment, the indicator elements comprise LED's (light emitting diodes) 261. The LED's 261 are selectively illuminated in accordance with signals received from the respective support unit to indicate the status of a number of functional elements of the data storage unit. For example, LED's are illuminated to indicate correct operation of each power supply unit, each control unit, fans located within the support units, connection cables, etc.

The mid-plane 201 comprises a circuit board that supports electric connectors 324, 325, 326, 327, 340, 341 and 342 configured to co-operate with electric connectors on each of the control modules 204 and 205, the power supplies 206 and 207 and the cable modules 210, 211 and 212 respectively.

FIG. 4

Figure 4:
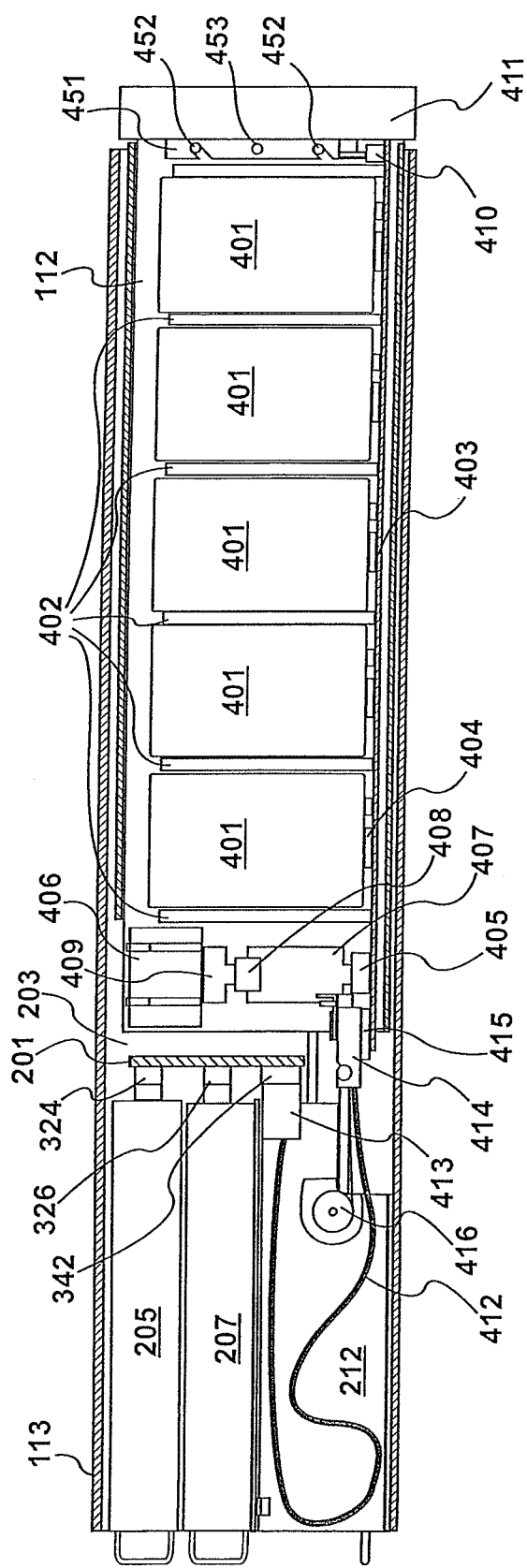
FIG. 4 shows a simplified cross-section view of the data storage unit 101.

A simplified cross-section view of the data storage unit 101 is shown in FIG. 4. The cross-section is through the support unit 112 of data storage unit 101 in a plane parallel to the side wall 203 of the outer main housing 113 and perpendicular to the mid-plane 201.

In the present example, each of the support units 110, 111 and 112 is similarly configured. Thus, it will be understood that the following description relating to support unit 112 also applies to support units 110 and 111.

The support unit 112 contains twenty 3.5" (three point five inch) disk drives 401 mounted between support members 402 on a printed circuit board 403, which will be referred to as the support unit board 403. The disk drives are arranged in five rows, such that each row has four disk drives. Each disk drive 401 is electrically connected with circuitry on the support unit board 403 by electric connectors 404 mounted on the support unit board.

The support unit board 403 also has a pair of connectors 405 (one of which may be seen in FIG. 4) for providing electric power to a first fan module 406, via a riser card 407. The riser card 407 is a relatively small printed circuit board having a lower end section shaped to be located within, and to provide electrical connection with, the connector 405. The riser card 407 itself has a female electric connector 408 fixed to its upper end. The connector 408 receives a lower portion of a further printed circuit board 409, that forms a part of the fan module 406, and thereby provides power to the fan module 406.

The support unit board 403 has a further connector 410, close to its front end, for providing electric power to a second fan module 411 that forms the front of the support unit 112. The fan module 411 is provided with two pairs of hooks 451 and each side wall of the support unit 112 is provided with a pair of inwardly extending pins 452. The fan module 411 is thus suspended on the pins 452 by the hooks 451. A screw 453 located through a hole in each side wall of the support unit 112 is used to lock the fan module 411 in place.

During operation, the first fan module 406 and the second fan module 411 are each configured to provide a flow of air through the support unit 112 and through the control units (such as control unit 305) and power supply units (such as power supply unit 307). In the present embodiment, the fan modules 406 and 411 are each capable of providing a sufficient flow of air to cool the disk drives 401, independent of the operation of the other fan module. Thus, in the event that one fan module fails, the other fan module is able to provide the necessary airflow until the defunct fan module is replaced.

As mentioned previously, the cable module 212 contains a pair of electric cables. One of the pair of electric cables, cable 412, is shown in FIG. 4. Each of the electric cables terminates at one end with a connector 413, and terminates at the other end with a connector 414. The connectors 413 connect with a respective one of the connectors 341 on the mid-plane 201, while the connectors 414 connect with a corresponding one of a pair of electric connectors 415 mounted at the rear edge of the support unit board 403.

The cable 412 is of sufficient length to allow the support unit 112 to slide forwards out from its main housing 113, while the cable is still connected to the mid-plane 201. Consequently, when the support unit 112 is in its normal operating position, shown in FIG. 4, a portion of the cable 412 is bent into several loops within the cable module 212. A guide module 416 is mounted within the cable module 212, and as will be described below, this module ensures that no such loops are formed in the cable 412 outside of the cable module.

FIG. 5

Figure 5:
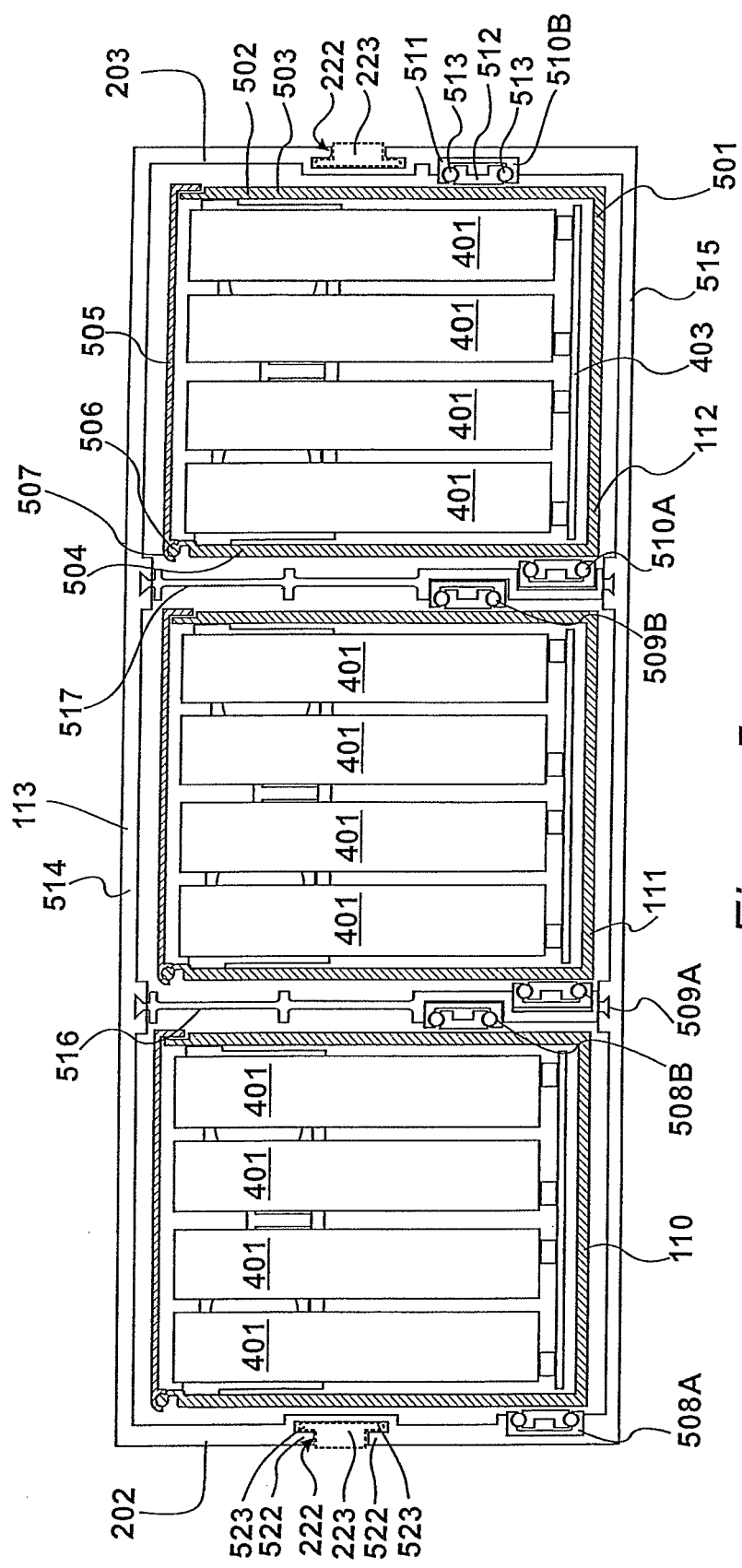
FIG. 5 shows a further cross-section view of the data storage unit 101.

A further cross-section view of the data storage unit 101 is shown in FIG. 5. The cross-section is through the support units 110, 111 and 112 of data storage unit 101 in a plane perpendicular to the side wall 203 of the outer main housing 113 and parallel to the mid-plane 201.

The support unit board 403 is supported above a floor 501 of the support unit 112. The floor 501 is formed as part of a U-shaped channel 502, having side walls 503 and 504. A lid 505 covers the open end of the U-shaped channel 502 so that the disk drives 401 effectively reside within a rectangular tube through which the fan modules 406 and 411 blow a stream of air during operation.

The lid 505 is attached to one side wall 504 of the U-shaped channel by a hinge mechanism 506. In the present embodiment the U-shaped channel and the lid are formed as aluminium extrusions, and the hinge mechanism 506 is formed as part of the extrusions. An upper edge of the side wall 504 is formed with an outer surface having a partial cylindrical shape. The corresponding edge 507 of the lid is formed with a slot having an inner surface that has a partial cylindrical shape of similar diameter, such that said inner surface of the slot is located around said outer surface of the upper edge of the side wall 504.

When the support unit 112 is manufactured one end of the upper edge of the side wall 504 is located within one end of the cylindrically shaped slot of the lid 505 and then the lid is slid into position. The lid is provided with a transverse notch (not shown) on its edge 507, and a locking pin (not shown) is located in the side wall 504 at the location of the notch. Consequently, the locking pin acts on the sides of the notch to prevent the lid 505 from sliding out of position along the side wall 504.

The main housing 113 is provided with a pair of slots on the inside of its upper wall 514 and a similar pair of slots on the inside of its lower wall 515. These slots are configured to receive respective upper and lower edges of partition wall elements 516 and 517, which partition the front of the main housing into three compartments. Each of the compartments is configured to receive one of the support units 110, 111 or 112. In the present embodiment, partition wall elements 516 and 517 are also formed as aluminium extrusions.

The support units 110, 111 and 112 are each supported within the main housing 113 by a pair of slide rails. Support unit 110 is supported by slide rails 508A and 508B, support unit 111 is supported by slide rails 509A and 509B and support unit 112 is supported by slide rails 510A and 510B. In the present embodiment the slide rails are friction slides in which an inner metal rail 512 is held within an outer metal rail 511 by sections 513 of a low friction plastics material.

The main housing 113 is formed with recesses along the inside of its side walls 202 and 203 that are shaped to receive the outer rails 511 of slide rails 508A and 510B. Similarly, the partition wall elements 516 and 517 are formed with recesses shaped to receive the outer rails 511 of slide rails 508B and 509A, and 509B and 510A respectively. As shown in FIG. 5, the two slide rails of each support unit 110, 111 and 112 are positioned at different heights, such that the top edge of the lowest slide rail is located at a height that is below the bottom edge of the highest slide rail. Consequently, the two slide rails 508B and 509A supported by the partition wall element 516 are also at different heights, which means that the width of space taken up by the partition wall and the slide rails is minimised. (The situation is also similar for slide rails 509B and 510A supported by partition wall element 517.) Thus by vertically staggering the slide rails in this manner, it is possible for the data storage unit 101 to benefit from the use of the slide rails and contain the three support units 110, 111 and 112, while still being sufficiently narrow to fit within a 19" rack.

It may be noted that the side walls 202 and 203 of the main enclosure 113 are provided with recesses along their inner faces which are dimension to receive the slide rails 508 and 511. As may be seen from FIG. 5, the recesses receiving the slide rails 508 and 511 are provided at different heights so that they correspond with difference in heights of the slide rails on the support units. As mentioned above, the main housing 113 is formed from several aluminium alloy extrusions, and the recesses receiving the slide rails 508 and 511 are formed during the extrusion process.

The rack rails 223, previously shown in FIG. 2, are shown in dotted outline in FIG. 5 located in their respective grooves 222. In the present embodiment the rack rails 223 have a T-shaped cross-section and the grooves have a corresponding T-shaped cross-section. Thus the sides of the grooves 222 are provided with a pair of inwardly extending lips 522 that locate behind outwardly extending lips 523 on the rails 223.

In an alternative embodiment, the rails 223 and grooves 222 are provided with an L-shaped cross-section, and consequently each groove has a single lip for locating behind the single lip formed along the rail.

As will be apparent from FIG. 5, most of the width of the rails 223 extends into the side walls of the main enclosure 113, and this is made possible by the presence of the grooves 222 formed in the side walls of the main enclosure 113. As a result, the data storage unit 101 is simply and securely mounted within the rack (102) without unnecessarily reducing the width available for accommodating disk drives.

In an alternative embodiment, the U-shaped channel 502 is made from sheet steel formed into the U shape by bending.

In an alternative embodiment, the slide rails 508A, 508B, 509A, 509B, 510A and 510B are each replaced by three section friction slides and have metal to metal sliding surfaces.

FIG. 6

Figure 6:
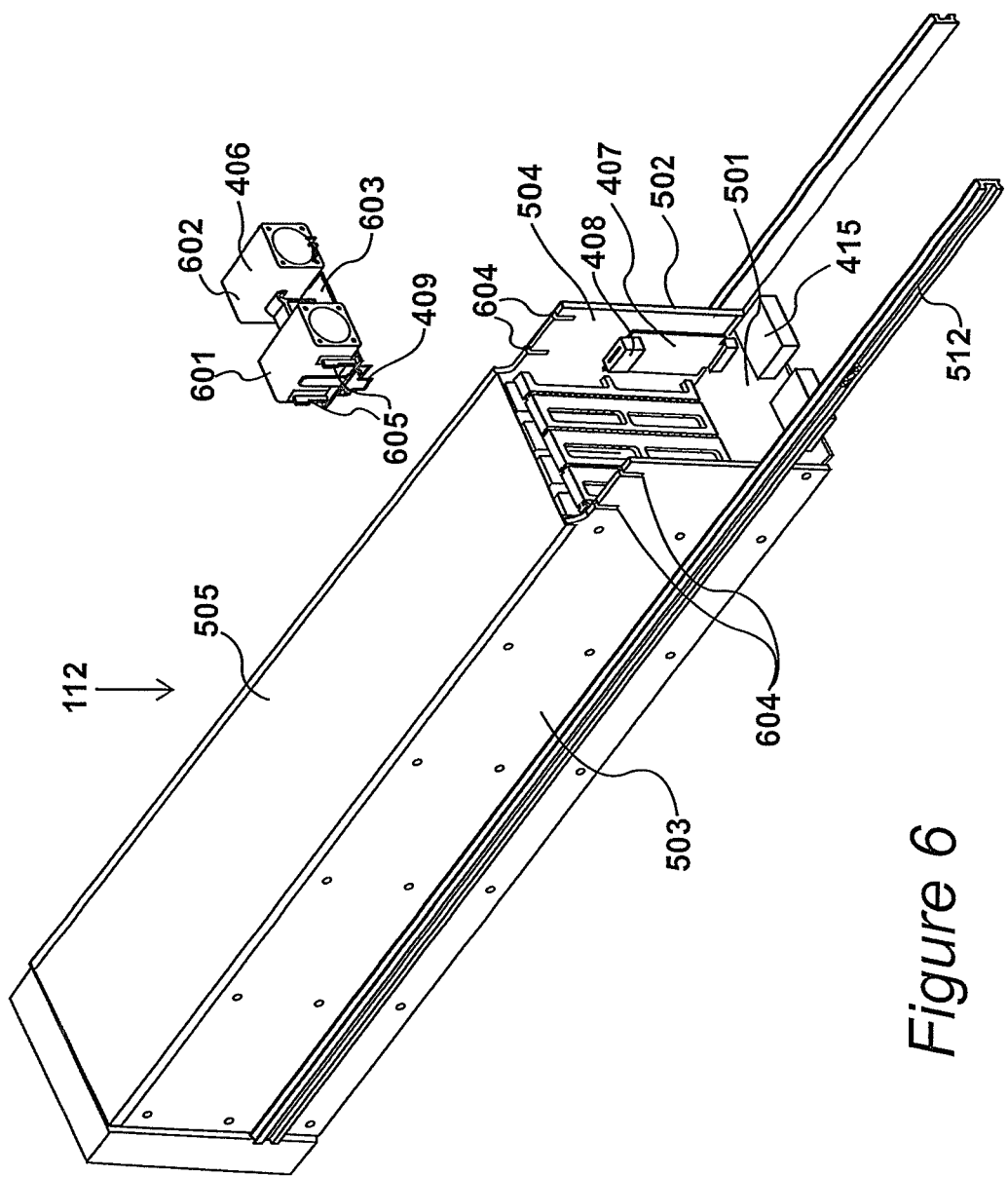
FIG. 6 shows a perspective view of the rear of the support unit 112 removed from the outer main housing 113.

A perspective view of the rear of the support unit 112 removed from the outer main housing 113 is shown in FIG. 6, with the fan module 406 removed.

As shown in FIG. 6, the lid 505 encloses most of the top of the U-shaped channel 502 formed by the floor 501 and side walls 503 and 504. However, the lid 505 does not extend over a portion of the support unit 112 that normally contains the fan module 406. Consequently, the fan module 406 may be removed from the U-shaped channel 502 without opening the lid 505.

The fan module 406 comprises a pair of fans 601 and 602 mounted on a frame 603 formed of a plastics material. Each side wall of the U-shaped channel is provided with a pair of slots 604, and each side of the frame 603 is provided with a pair of outwardly extending members 605 configured to fit into the slots 604. Thus, when fitted, the outwardly extending members 605 located in the slots 604 suspend the fan module 406.

The fans 601 and 602 are electrically connected to the pair of downward extending printed circuit boards 409. The riser cards 407 (one of which may be seen in FIG. 6) are symmetrically arranged within the U-shaped channel such that, when the outwardly extending members 605 are located in the slots 604, the lower portion of the printed circuit boards 409 are located within the electric connectors 408 on the riser cards 407. This arrangement allows a fan module 406 to be replaced simply by unplugging the fan module, and plugging in a new module.

FIG. 7

Figure 7:
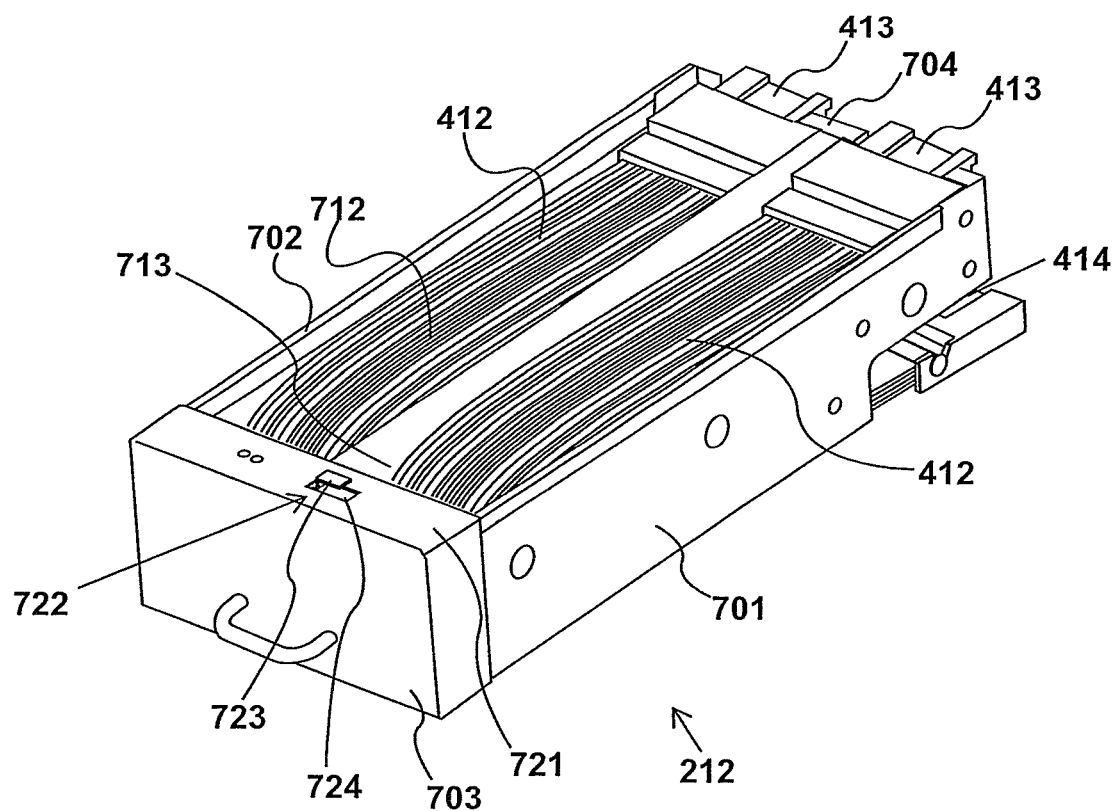
FIG. 7 shows the cable module 212 removed from the data storage unit 101.

The cable module 212 is shown in FIG. 7, removed from the data storage unit 101. The cable modules 210, 211 and 212 are substantially identical, and therefore it will be understood that the following description of cable module 212 similarly applies to the other two cable modules. The cable module 212 is formed on a metal U-shaped channel having side walls 701 and 702 extending upward from a floor. The rear end of the cable module 212 is closed by a rear wall 703, and the front end of the unit 212 is partially closed by a front wall 704 that supports two similar electric connectors 413. The electric connectors 413 are rigidly fixed to the front wall 704 of the cable module 212 and are configured to mate with the corresponding connectors 342 on the mid-plane 201. The electric connectors 413 are each electrically connected to a respective electric cable 412. The electric cables 412 are therefore connected at a first end to a respective one of the electric connectors 413 and are terminated at their opposite end by a respective one of the electric connectors 414. The electric connectors 414 are configured to mate with a corresponding one of the electric connectors 415 on the support unit 112.

The cable module 212 also comprises a partition wall 713 which extends centrally along the cable module 212 from the rear wall 703 to the front wall 704, between the two electric cables 412. The partition wall 713 effectively splits the space within the cable module 212 in two, and ensures that the two electric cables 412 do not mechanically interfere with each other.

A narrow top wall 721 extends forwards from the uppermost edge of the rear wall 701, and a safety device 722 is mounted on the top wall 721. The safety device 722 comprises a button 723 that extends up through a correspondingly formed aperture 724 in the top wall 721. The button 723 is mounted on a spring such that it is urged upwards to a position in which it protrudes above the top wall 721, but under finger pressure it may be pushed down to be level with the top wall. Consequently, before positioning the cable module 212 in its operational position in the data storage unit 101, the button 723 must be depressed Unlike conventional signal cables, each of the cables 412 comprises both power wires and high speed signal wires (SAS (serial attached SCSI (Small Computer System Interface) wires) in a single cable.

FIG. 8

Figure 8:
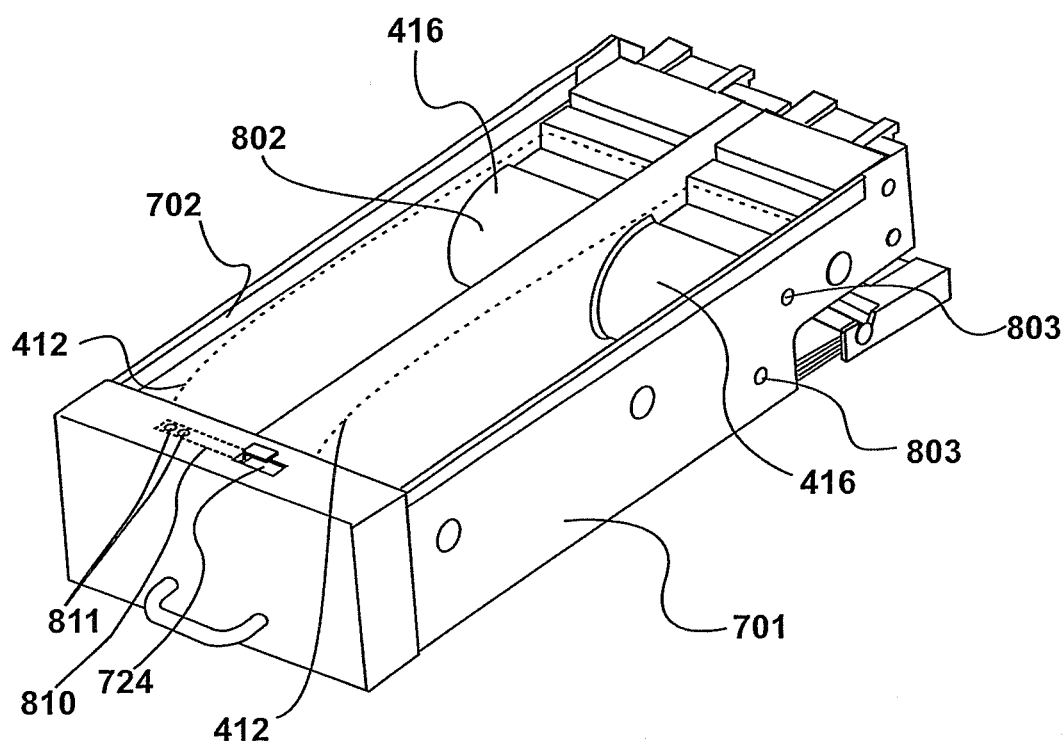
FIG. 8 shows the cable module 212 with the electric cables 412 in dotted outline only.

The cable module 212 is shown again in FIG. 8, but with the electric cables 412 in dotted outline only. FIG. 8 also shows a rear view of the guide module 416 that is fixed within the cable module 212. The guide module 416 comprises a housing 802 formed of a solid plastics material. The housing 802 is held rigidly in place by screws 803, which extend through the side walls 701 and 702 of the cable module 212. The housing 802 supports inner components of the guide module 416, as will be described below, and also provides a barrier between the electric cables 412 and these inner components.

The spring 810 on which the button 723 is mounted is shown in dotted outline in FIG. 8. In the present embodiment, the spring 810 and the button 723 are formed of a single strip of bent metal that is attached at one end to the underside of the top wall 721 by a pair of screws 811. The other end of the strip is bent to form the button 723 that protrudes up through the aperture 724.

FIG. 9

Figure 9:
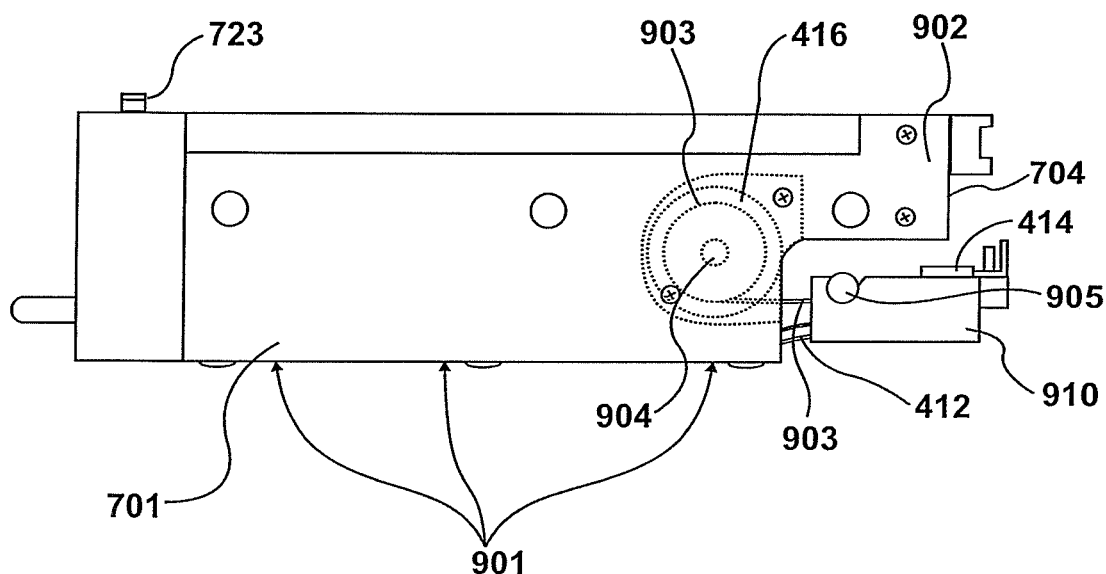
FIG. 9 shows a side view of the cable module 212.

The cable module 212 is shown again in the side view of FIG. 9.

The side walls 701 and 702 extend along the length of the floor panel 901 but have an upper portion 902 that extends substantially further forward than the floor panel 901. Thus, an aperture is defined between the side walls 701 and 702, the front wall 704 and the floor panel 901. The guide module 416 (shown in dotted outline in FIG. 9) is mounted within the cable module 212 adjacent to this aperture.

The guide module 416 comprises a pair of constant force springs 903 axially mounted on a shaft 904 and having a free end attached to a connecting rod 905. The constant force springs are shown in FIG. 9 in their stable, coiled up, configuration, having only a short substantially straight end portion connected to the connecting rod 905. However, it will be understood that by pulling on the connecting rod 905 it is possible to uncoil the constant force springs 903 such that they extend substantially linearly forward from the front of the cable module 212.

The constant force springs 903 each have a shape similar to that of a retractable steel tape measure which may be coiled up into a housing but when extended forms a substantially rigid straight length of material that resists bending. It is this feature of the constant force springs 903 that ensures that the cables 412 do not form bends out side of the cable module 212 when they are pushed back into the cable module after being extended.

The connecting rod 905 fixed to the free end of the constant force springs 903 is retained within a connection module 910 which also contains the electric connectors 414 at the ends of the cable 412. Thus, when the connectors 414 are pulled forward from the cable module 212, the constant force springs are uncoiled and extend forward, above the portions of the electric cables 412 that extend from the cable module.

In an alternative embodiment, the floor panel 901 is reduced in length such that it only extends by approximately 75 mm from the rear wall 703. Consequently, any potential problems with the electric cables 412 binding on the front edge of the floor panel are avoided.

FIGS. 10A, 10B and 10C

The connection module 910 is shown in further detail in the perspective view of FIG. 10, the simplified bottom view of FIG. 10B and simplified cross-sectional view of FIG. 10C.

The connection module 910 comprises a saddle element 1001 in which the electric connectors 414 are mechanically retained. An end plate, 1002A and 1002B respectively, is fixed to the saddle element 1001, at either side of the connectors 414. The end plates 1002A and 1002B each define a notch 1003 having a width and shape configured to receive and retain the connecting rod 905 that is fixed to the end of the constant force springs 903.

As illustrated in FIGS. 10B and 10C, the saddle element 1001 has a hole 1004 extending upward from its lower surface 1005. The hole 1004 extends up to an enlarged void 1006. This feature may be used to latch the connection module in a temporary, convenient position during some repair or updating procedures that may be performed on the data management unit 101, as will be further discussed below.

In an alternative embodiment, the end plates 1002A and 1002B each define a hole rather than a notch. The holes are dimensioned to receive respective ends of the connecting rod 905. The rod is located within the holes while the end plates are loosely attached and then screws 1007 holding the end plates in place are tightened.

FIG. 11

For a number of repair and maintenance procedures it is necessary to slide a selected one of the support units (110, 111 or 112) out from within the outer main housing 113 of the data storage unit. For many such procedures the data storage unit 101 may remain in its operational condition, thereby minimising inconvenience, minimising loss of business, etc.

The data storage unit 101 is shown in FIG. 11, mounted in the rack 102 with support unit 112 pulled out from within the main housing 113. The data storage unit is operating, and therefore, provided they are functioning properly, the fan modules 411 and 406 continue to provide a flow of cooling air through the tube formed by the U-shaped channel 502 and the lid 505.

In the event that the fan module 406 has stopped working properly, this may be unplugged and replaced with a new module, with the data storage unit 101 still operating and with the lid 505 closed.

If the fan module 411 is faulty, the screws 453 are removed, the lid 505 is opened and the fan module is unhooked from the pins 451. The fan module 411 may then be replaced with a new module.

FIG. 12

The data storage unit 101 is shown in FIG. 12 with the support unit 112 pulled out from the main housing 113 and with the lid 505 of the support unit 112 open. Thus, the disk drives 401 within the support unit 212 are accessible. A faulty disk drive has been removed from the support unit 112 leaving an empty bay 1201. A new disk drive 1202 is being inserted into the empty bay 1201, to replace the faulty disk drive. While the lid 505 is open, a portion of the desired airflow is lost though the top of the U-shaped channel 502. However, as soon as the disk drive 1202 is in position, the lid may be closed to re-establish the desired airflow.

FIG. 13

A second data storage unit 1301 embodying the present invention is shown in FIG. 13. The data storage unit 1301 is identical to data storage unit 101 except that the middle unit 1302 is a different type to units 1310 and 1312. Units 1310 and 1312 are essentially the same as support units 110 and 112 of data storage unit 101, and each contain twenty disk drives. However, unit 1311 is contains no disk drives, and is not configured to contain any disk drives. Consequently the overall cost of the data storage unit 1301 is low compared to that of data storage unit 101.

As will be further described below, the unit 1302 is provided with fan modules 406 and 411, such that it is able to assist units 1310 and 1312 with air cooling the control units and power supply units of the data storage unit 1301. The unit 1302 is also provided with LED's 1361 such that it is able to provide indications relating to status in a similar manner to the LED's 261 of the support units 1310 and 1312.

FIG. 14

A side view of the data storage unit 1302 is shown in FIG. 14. Like support unit 112, the unit 1302 comprises a U-shaped channel 1401 enclosed at the top by a lid 1402. The U-shaped channel 1401 and lid 1402 are formed from extruded aluminium, in the same way as U-shaped channel 502 and lid 505, but the U-shaped channel 1401 and lid 1402 are shorter in length, being only approximately twenty centimeters long.

Inner slide rail 1403A and 1403B are fixed to the side walls of the U-shaped channel 1401 in a similar configuration to the inner rails mounted on support unit 112. Thus, the unit 1302 is mountable within a data storage unit, such as data storage unit 101 or 1301 in place of a support unit such as support unit 112.

A printed circuit board 1405 is mounted within the U-shaped channel parallel with the floor of said channel. The printed circuit board 1405 has an electric connector 1406 close to its front edge for supplying electric power to a fan module 411, and a pair of connectors 1407 for providing electric power to a fan module 406 via riser cards 407. A pair of connectors 1408 are mounted on the rear edge of the printed circuit board that are configured to connect to the usual cables 412 of a cable module, such as cable module 212.

The printed circuit board 1405 comprises no circuitry, connectors or components relating to disk drives, because it is not intended that it should ever contain disk drives. Consequently, the unit 1302 is considerably less expensive to manufacture than a support unit such as support unit 112.

FIGS. 15A, 15B, 15C, 15D, 15E, 15F, 15G, 15H

The unit 1302 has similar types of slide rail and electrical connections to the support units, such as support unit 1310 and 1312. Consequently, it is possible to remove the unit 1302 from the data storage unit 1301 and replace it with a support unit of the same type as support units 1310 and 1312. Thus, the data storage unit 1301 may be upgraded from a data storage unit comprising forty disk drives to a data storage unit having sixty disk drives.

Similarly, it is also possible to have a data storage unit containing one support unit, such as unit 1301, having twenty disk drives along with two units, such as unit 1302, which contain no disk drives, so that the data storage unit only has twenty disk drives in total. This data storage unit may then be upgraded to contain forty or sixty disk drives by replacing one or both of the units, like unit 1302, that contain no disk drives, with support units, like units 1310, 1311, 1312, having twenty disk drives.

The process of replacing the unit 1302 with a support unit containing disk drives is illustrated by FIGS. 15A to 15H. In each of these figures, the data storage unit 1301 is shown in cross-section, the cross-section being through the middle cable module 211 (of the three cable modules) and parallel to the side walls of the data storage unit 1302.

The data storage unit 1301 is shown in its initial state in FIG. 15A. The data storage unit 1301 is operating and the fan modules 406 and 411 of unit 1302 are operating to provide a flow of air for cooling the control units, such as 204, and power supply units, such as 206. The unit 1302 is to be replaced while the rest of the data storage unit 1301 continues to operate. Consequently, in the configuration of FIG. 15A, the cable 412 is providing electric power to the unit 1302. (Typically the power supplied to the units, including unit 1302 is 480 VA.)

In order to isolate the unit 1302 from the electric power supply, the cable module 211 is pulled out from its operational position within the data storage unit 1301, until the button 723 pops up under the action of its spring. This movement is sufficient to disengage the electric connectors 413 of the cable module 211 from the corresponding connectors 341 on the mid-plane 201. Thus, the power to the unit 1302 is cut.

It may be noted that the person pulling the cable module 211 from its operating position does not have to go near the connector 413 at the front of the cable module to pull it from the connector on the mid-plane 201. In fact, the rear wall 703 of the cable module 211 provides a safety barrier preventing access to the connectors and the mid-plane 201.

The data storage unit 211 is shown in FIG. 15B after this movement of the cable module 211. Because the button 723 is protruding up, it prevents the cable module 211 from being accidentally re-inserted into its operating position. Therefore, the unit 1302 may now be safely worked on.

The unit 1302 is then slid out from within the main housing 113 of the data storage unit 1301 as shown in FIG. 15C. The U-shaped channel 1401 is completely outside of the main housing 113 but the unit 1302 is still suspended from the data storage unit 1301 by its slide rails 1403A and 1403B.

A retaining tool 1505 is then attached to the front lower edge of the main housing 113 in a position between the two cables 412 of the cable module 211. The retaining tool 1505 is shown attached to the main housing in FIG. 15D.

The retaining tool 1505 comprises a flat plate 1506 having a hook-shaped end 1507 extending to one side of the flat plat. The hook-shaped end 1507 is configured to hook around the front edge of the main housing 113. A post 1508 extends from the other side of the flat plate 1506. The post 1508 has an enlarged head configured to fit through the hole 1004 formed in the under-side of the connection module 910.

After positioning the retaining tool 1505, the electric connectors at the ends of the electric cables 412 are disconnected from the electric connectors 1408 of the unit 1302. The connection module 910, which carries the electric connectors at the end of the cables 412, is then temporarily stored by locating the hole 1004 on its under-side over the post 1508. The enlarged head of the post 1508 enters the void 1006 within the connection module 910 so that the connection module 910 is effectively hooked onto the post 1508.

The data storage unit 1301 is shown in FIG. 15E with the connection module 910 temporarily stored on the retaining tool 1505.

It may be noted that the connecting rod 905 fixed to the end of the constant force spring 903 remains located within the notches 1003 of the connection module 910. Consequently, the connection module 910 is urged inwards into the main housing 113, but is held in place by the retaining tool 1505.

The unit 1302 is then slid further out from the data storage unit 1301 and its inner slide rails 1403A and 1403B disconnected from the outer rails 511 of the main housing data storage unit 1301.

A new supporting unit (1510 in FIG. 15 F) is then fitted in place of unit 1302.

In the present example, the new support unit 1511 is identical to support unit 112 and its features will be given the same reference numerals as those of support unit 112.

Firstly, the inner rails 512 of the new supporting unit 1510 are located in the outer rails 511 within the data storage unit 1301. The new supporting unit 1510 is then slid toward the main housing 113 to a position in which its electric connectors 415 at the rear edge of its support unit board 403 are accessible. The connection module 910 is then unhooked from the retaining tool 1505 and the electric connectors carried by the connection module 910 are connected to the electric connectors 415 of the support unit 1510. The retaining tool is then removed.

Figure 15F:
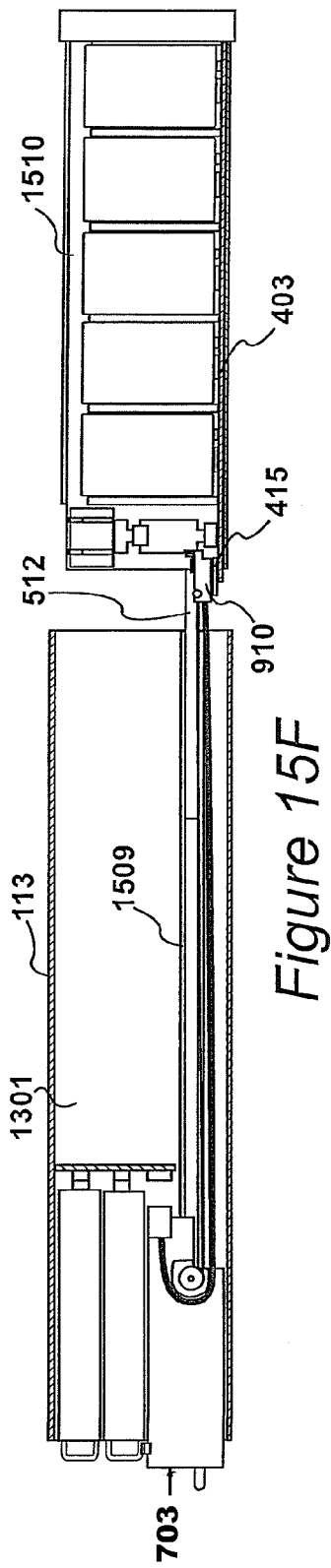

The data storage unit 1301 with the new support unit 1510 connected is shown in FIG. 15F.

Figure 15G:
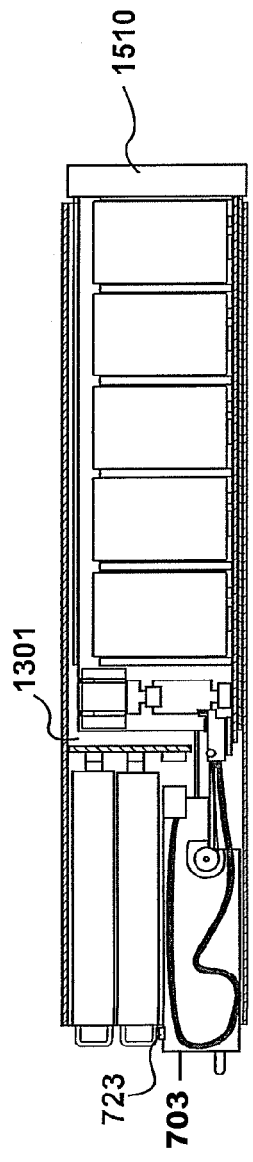
Figure 15H:
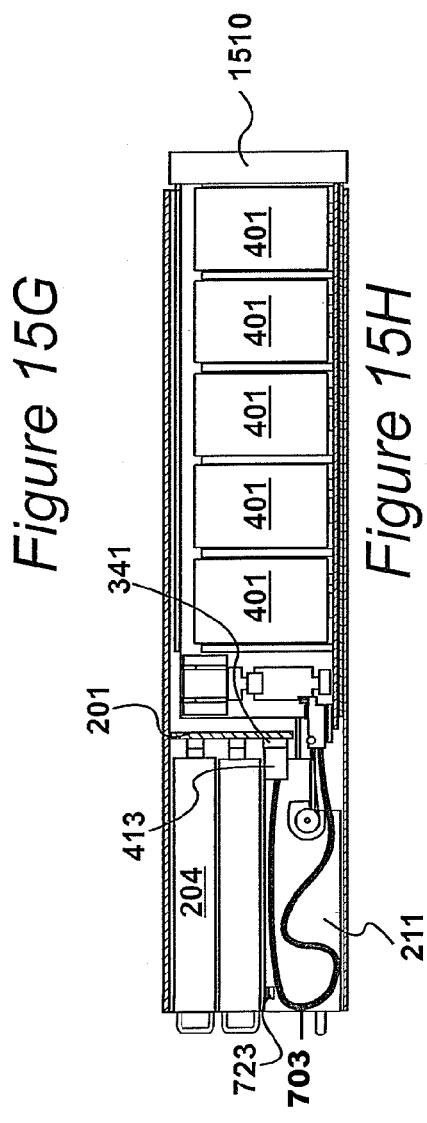

The support unit 1510 is then slid into the main housing 113 into it normal operating position as shown in FIG. 15G.

Finally, the button 723 on the cable module 211 is depressed and the cable module 211 is pushed back into its normal operating position, such that the connectors 413 of the cable module 211 reconnect with the connectors 341 on the mid-plane 201. Thus, power is supplied to the support unit 1510 and the control units 204 are able to access the disk drives 401 of the support unit 1510.

FIG. 16

In a data storage device embodying a further aspect of the present invention, at least one support unit comprises a different type of disk drive to the other two supports units. Such a data storage device 1601 is shown in cross-section in FIG. 16. The data storage device contains two support units 1611 and 1612 that are substantially identical to support unit 112, and so each contain twenty 3.5" hard disk drives 401. The third support unit 1602 is similarly configured to support units 1611 and 1612 but differs in that it contains a support unit board 1603 having connectors 1604 arranged to connect to thirty two 2.5" hard disk drives 1605. The hard disk drives 1605 have the standard 2.5" hard disk drive form factor and a thickness of 15 mm.

The support unit 1602 has similar slide rails to the other support units and similar electric connectors for connecting to the main part of the data storage unit. Consequently, the support unit 1602 may be fitted as a replacement for a support unit containing 3.5" disk drives or a unit of the same type as unit 1302. When making such a replacement, it may be performed using a similar method to that described with reference to FIGS. 15A to 15H.

FIGS. 17A and 17B

A plan view of the support unit 112 without the fan module 406 and without the disk drives 401 fitted is shown in FIG. 17A, and a plan view of the support unit 1602 without the fan module 406 and without the disk drives 401 fitted is shown in FIG. 17B.

The support unit card 403 of the support unit 112 is a printed circuit board on which are mounted twenty connectors for connecting to a respective twenty 3.5" disk drives. The support unit card 403 also has: the two electric connectors 405 for receiving the riser cards 408; the connector 410 for connecting to the fan module 411; and two electric connectors 415 for connecting to the cables of a cable module, such as cable 412 of cable module 212.

The support unit 1602 has a similar form to support unit 112 and contains the support unit card 1603 having similar dimensions to the support unit card 403 and similar connectors 410, 405 and 415 as described for support unit card 403. However, support unit card 1603 is a printed circuit board on which are mounted the 32 connectors 1604 arranged to receive 2.5" disk drives. The connectors are arranged in seven rows, with each of six rows containing five connectors and one row containing two connectors.

In each of the described embodiments, the support units of a data storage unit (such as data storage unit 101) are individually mounted on slide rails and connection from the support units to the mid-plane of the data storage unit is made by flexible cables. As a consequence, there is relatively little mechanical vibration transmitted from the support unit card of one support unit (such as card 403 of support unit 112) to the support unit card of another support unit. This is particularly true of the above-described embodiments in which the support units are formed of aluminium, because the aluminium tends to be a poor conductor of the vibrations that are produced.

A further alternative embodiment makes use of the vibrational isolation of the support units. In this embodiment, a data storage unit has SAS disk drives in one support unit and SATA disk drives in another of the support units. In general, SAS disk drives generate more vibrational energy than SATA disk drives, and the SAS disk drives are also capable of operating in conditions where higher levels of vibrational energy exists. Consequently, it is possible to operate a number of disk drives in close proximity to each other provided they are of the same one of these two types, but operating SAS disk drives and SATA disk drives in close proximity can adversely effect the operational efficiency of the SATA disk drives. However, in the present alternative embodiment, the SATA disk drives are located in a separate support unit to the SAS disk drives, and so only a small proportion of the vibrational energy generated by the SAS disk drives is conducted to the SATA disk drives. As a result, the two disk types are able to reside successfully in a single data storage unit.

The invention claimed is:
1. Apparatus for storing data and supplying stored data, said apparatus comprising:
   a main housing;
   an electric power supply located within said main housing;
   a panel located within said main housing, said panel supporting a plurality of electric connectors for connecting said power supply to other component parts of said apparatus;
   a plurality of units, each said unit comprising a plurality of data storage elements, each said unit being mounted to slide within said main housing such that each one of said units is slidable out from said main housing to provide access to said data storage elements of said unit, and a plurality of cable modules, each cable module comprising a cable having a first connector at a first end configured to connect to one of said units and a second connector at a second end configured to connect with one of said electric connectors supported by said panel, and a moveable rigid structure supporting said second connector and providing a barrier preventing manual access to said panel, said second connector being attached to said rigid structure such that movement of said rigid structure causes said second connector to be disconnected.

2. Apparatus as claimed in claim 1, wherein each said cable module comprises a handle attached to said rigid structure.

3. Apparatus as claimed in claim 1, wherein each said unit comprises a fan providing a flow of air for cooling the data storage elements within that unit.

4. Apparatus as claimed in claim 1, wherein each said cable module comprises a device arranged to move from (i) a first configuration in which said rigid structure is allowed to move to an operational position in which said second connector is connected with one of said electric connectors supported by said panel, and (ii) a second configuration in which said device prevents said rigid structure from moving to said operational position.

5. Apparatus as claimed in claim 4, wherein said device is arranged to automatically move to said second configuration when said rigid structure is moved from said operational position.

6. Apparatus according to claim 1, wherein each said cable module comprises a respective retractable guide member configured to extend along a portion of the respective cable as the respective unit is slid out from said main housing.

7. Apparatus as claimed in claim 6, wherein said retractable guide member is configured to roll up while the respective unit is slid back into said main housing.

8. Apparatus as claimed in claim 7, wherein said guide member is an elongate shape configured to bend easily in one direction and less easily in an opposite direction, so that said guide member bends in a first direction when rolling up, and resists bending in the opposite direction when guiding said cable.

9. Apparatus as claimed in claim 7, wherein said guide member comprises a spring, such that force generated by the spring urges said guide member to a retracted configuration.

10. Apparatus for storing data and supplying stored data, said apparatus comprising:
a main housing;
an electric power supply located within said main housing;
a panel located within said main housing, said panel supporting a first plurality of electric connectors for connecting said power supply to other component parts of said apparatus;
a plurality of units, each said unit comprising a second plurality of electric connectors for connecting to data storage elements, each said unit being mounted to slide within said main housing such that each one of said units is slidable out of said main housing to provide access to said data storage elements of said unit, and
a plurality of cable modules, each cable module comprising a cable having a first connector at a first end configured to connect to one of said units and a second connector at a second end configured to electrically connect with one of said first plurality of electric connectors supported by said panel, and a rigid structure, said second connector being attached to said rigid structure, said rigid structure being moveable from (i) a first position in which said second connector is connected to one of said first plurality of electric connectors supported by said panel and said rigid structure provides a barrier preventing manual access to said panel, and (ii) a second position in which said second connector is disconnected from said panel so that said one of said units is disconnected from said power supply.

11. Apparatus as claimed in claim 10, wherein each said cable module comprises a handle attached to said rigid structure.

12. Apparatus as claimed in claim 10, wherein each said unit comprises a fan providing a flow of air for cooling the data storage elements within that unit.

13. Apparatus as claimed in claim 10, wherein each said cable module comprises a device arranged to move from (i) a first configuration in which said rigid structure is allowed to move to said first position, and (ii) a second configuration in which said device prevents said rigid structure from moving to said operational position.

14. Apparatus as claimed in claim 13, wherein said device is arranged to automatically move to said second configuration when said rigid structure is moved from said first position.

15. Apparatus according to claim 10, wherein each said cable module comprises a respective retractable guide member configured to extend along a portion of the respective cable as the respective unit is slid out of said main housing.

16. Apparatus as claimed in claim 15, wherein said retractable guide member is configured to roll up while the respective unit is slid back into said main housing.

17. Apparatus as claimed in claim 16, wherein said guide member is an elongate shape configured to bend easily in one direction and less easily in an opposite direction, so that said guide member bends in a first direction when rolling up, and resists bending in the opposite direction when guiding said cable.

18. Apparatus as claimed in claim 16, wherein said guide member comprises a spring, such that force generated by the spring urges said guide member to a retracted configuration.

* * * * *